(12) United States Patent
Won et al.

(10) Patent No.: US 9,923,603 B2
(45) Date of Patent: Mar. 20, 2018

(54) METHOD FOR TRANSFERRING WIRELESS POWER

(71) Applicant: Korea Electronics Technology Institute, Seongnam-si, Gyeonggi-do (KR)

(72) Inventors: Yun Jae Won, Yongin-si (KR); Seung Ok Lim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 61 days.

(21) Appl. No.: 14/255,645

(22) Filed: Apr. 17, 2014

(65) Prior Publication Data

US 2014/0312833 A1    Oct. 23, 2014

Related U.S. Application Data

(60) Provisional application No. 61/812,988, filed on Apr. 17, 2013.

(51) Int. Cl.
| | |
|---|---|
| *H02J 7/00* | (2006.01) |
| *H04B 5/00* | (2006.01) |
| *H02J 7/02* | (2016.01) |
| *H02J 50/90* | (2016.01) |
| *H02J 50/80* | (2016.01) |
| *H02J 50/60* | (2016.01) |
| *H02J 50/10* | (2016.01) |
| *H02J 17/00* | (2006.01) |
| *H02J 5/00* | (2016.01) |

(52) U.S. Cl.
CPC ............ *H04B 5/0037* (2013.01); *H02J 5/005* (2013.01); *H02J 7/025* (2013.01); *H02J 17/00* (2013.01); *H02J 50/10* (2016.02); *H02J 50/60* (2016.02); *H02J 50/80* (2016.02); *H02J 50/90* (2016.02); *H04B 5/0062* (2013.01); *H04B 5/0075* (2013.01); *Y10T 307/25* (2015.04)

(58) Field of Classification Search
USPC ................................................. 320/106–112
See application file for complete search history.

(56) References Cited

U.S. PATENT DOCUMENTS

| | | | |
|---|---|---|---|
| 7,741,734 B2 | 6/2010 | Joannopoulos et al. | |
| 2010/0171368 A1* | 7/2010 | Schatz ................... | H01Q 1/248 307/104 |
| 2011/0115431 A1* | 5/2011 | Dunworth .......... | G06Q 30/0267 320/108 |
| 2011/0254503 A1* | 10/2011 | Widmer ................ | B60L 11/182 320/108 |
| 2012/0153894 A1* | 6/2012 | Widmer ............... | H04B 5/0037 320/108 |

(Continued)

*Primary Examiner* — Binh Tat
(74) *Attorney, Agent, or Firm* — Sughrue Mion, PLLC

(57) ABSTRACT

This invention defines management protocols for wireless power transfer to multiple devices in Multi-device Wireless Power Management System. Various functions of Multi-device Wireless Power Management System are justified from this invention. The WPT frames and messages which work between the management block of a charger and the management block or the coupler block of a device, or the coupler block of a charger are defined as well to execute various functions. Also the procedures for each functionality are described based on its frames and messages.

15 Claims, 42 Drawing Sheets

(56) References Cited

U.S. PATENT DOCUMENTS

2013/0063082 A1* 3/2013 Lee .................. H02J 7/025
                                                                        320/108
2013/0335020 A1* 12/2013 Moore ............... H02J 7/025
                                                                        320/109

* cited by examiner

FIG. 3

| | | Unit: Byte |
|---|---|---|
| 1 | 1 | 6 |
| Group ID | IC manufacturer's code | IC manufacturer's serial number |

FIG. 4

Unit: Byte

| 1 | 1 | 1 | 1 | 1 | 1 | 1 | N(0-255) | 1 |
|---|---|---|---|---|---|---|---|---|
| Src PMS ID | Src ID | Dst PMS ID | Dst ID | Frame type | Sequence No. | Payload Length | Payload | CRC |
| Frame Header | | | | | | | Frame Body | |

FIG. 5

| 7 | 1 | 1 | L₁ | L₂ | ... | Lₙ | 1 |
|---|---|---|---|---|---|---|---|
| Frame header | Data Code | Length (= ∑Lₙ) | Data Block-1 | Data Block-2 | ... | Data Block-n | CRC |
| | Data frame payload | | | | | | |
| | Frame body | | | | | | |

Unit: Byte

FIG. 6

Unit: Byte

| 1 | 1 | 1 | 1 | 1 | 1 | 1 |
|---|---|---|---|---|---|---|
| Src PMS ID | Src ID | Dst PMS ID | Dst ID | Frame type | Sequence No. | CRC |
| Frame Header |||||| Frame body |

FIG. 7

Unit: Byte

| 1 | 1 | $L_1$ | $L_2$ | ... | $L_n$ |
|---|---|---|---|---|---|
| Data Code | Length ($=\sum L_n$) | Data Block-1 | Data Block-2 | ... | Data Block-n |

FIG. 8

| | | | Unit: Byte |
|---|---|---|---|
| 1 | 1 | 1 | |
| Group ID | COM ID | Flag for containing data | |

FIG. 9

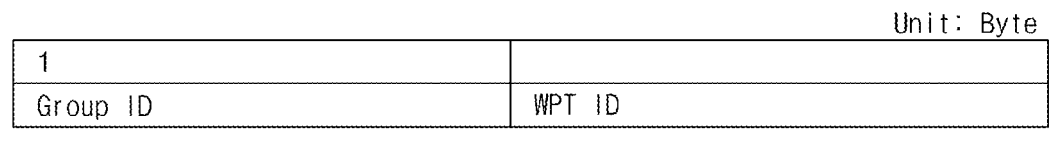

| | Unit: Byte |
|---|---|
| 1 | |
| Group ID | WPT ID |

FIG. 10

Unit: Byte

| 1 | 1 | 1 | 1 |
|---|---|---|---|
| Group ID | COM ID | Coil on/off | Time(ms) |

FIG. 11

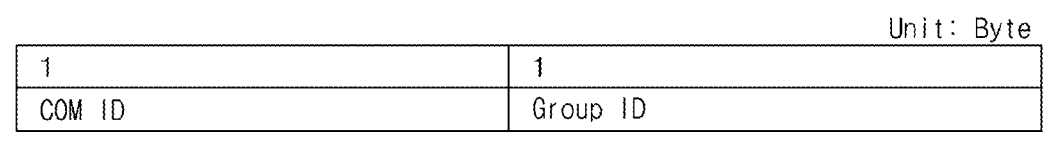

Unit: Byte

| 1 | 1 |
|---|---|
| COM ID | Group ID |

FIG. 12

Unit: Byte

| 8 | 1 | 1 |
|---|---|---|
| UCID | Maximum Power Required (W) | Time Length(ms) |

FIG. 13

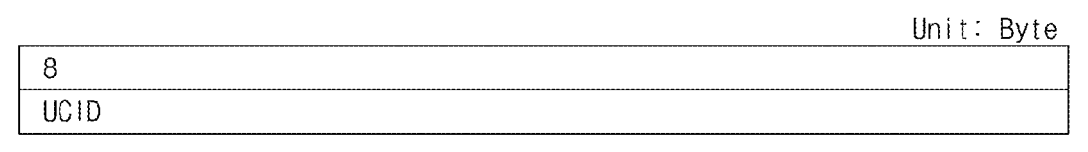

Unit: Byte

| 8 |
|---|
| UCID |

FIG. 14

Unit: Byte

| 1 | 1 | 1 | 1 | 1 | 1 | 1 | 1 |
|---|---|---|---|---|---|---|---|
| Flag | Reception Signal Strength | Frequency | Remain Battery | Discharge Rate of Battery | Max of Reception Power | Current Reception Power | Product Type |

FIG. 15

| | | Unit: Byte |
|---|---|---|
| 1 | 1 | 1 |
| WPT ID | Required Max Power(W) | Required Time(ms) |

FIG. 16

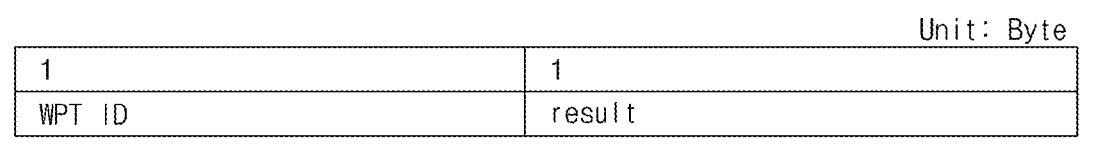

| | Unit: Byte |
|---|---|
| 1 | 1 |
| WPT ID | result |

FIG. 17

| | Unit: Byte |
|---|---|
| 1 | 1 |
| UCID | Assigned group ID |

FIG. 18

Unit: Byte

| 8 | 1 | 1 |
|---|---|---|
| UCID | Accept/Deny | WPT duration (ms) |

FIG. 19

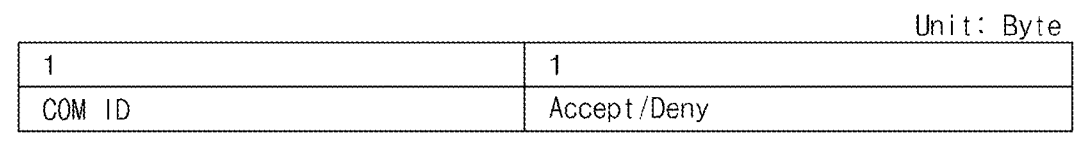

| | Unit: Byte |
|---|---|
| 1 | 1 |
| COM ID | Accept/Deny |

FIG. 20

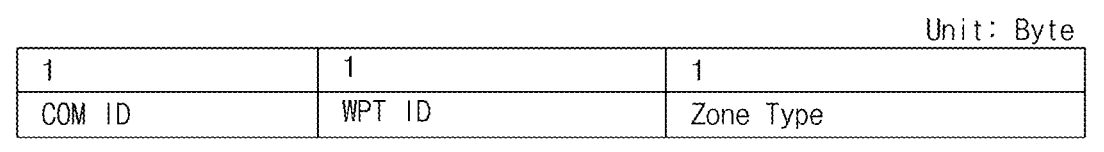

| 1 | 1 | 1 |
|---|---|---|
| COM ID | WPT ID | Zone Type |

Unit: Byte

FIG. 21

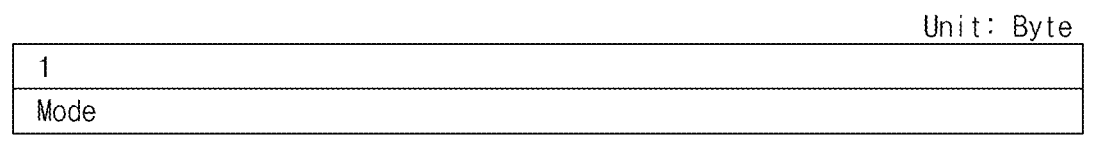

| | Unit: Byte |
|---|---|
| 1 | |
| Mode | |

FIG. 22

| | | Unit: Byte |
|---|---|---|
| 1 | 1 | 1 |
| WPT ID | Priority | WPT duration (ms) |

FIG. 23

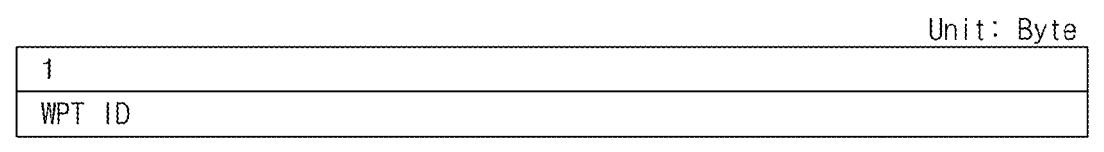

|  | Unit: Byte |
|---|---|
| 1 | |
| WPT ID | |

FIG. 24

| | Unit: Byte |
|---|---|
| 1 | |
| WPT ID | |

FIG. 25

| | | Unit: Byte |
|---|---|---|
| 1 | 1 | 1 |
| WPT ID | Discharge rate of Battery (%/h) | Maximum power level (w) |

METHOD FOR TRANSFERRING WIRELESS POWER

CROSS-REFERENCE TO RELATED APPLICATIONS

This application claims priority under 35 U.S.C. § 119 to U.S. Patent Application No. 61/812,988, filed on Apr. 17, 2013, the disclosure of which is incorporated herein by reference in its entirety.

TECHNICAL FIELD

The present invention relates to a method and a system for transferring wireless power, more particularly, to a method and a system which define management protocols for wireless power transfer to multiple devices in Multi-device Wireless Power Management System.

BACKGROUND

A wireless charging system using a magnetic induction phenomenon as wireless power transmission technologies wirelessly transmitting energy has been used.

For example, an electric toothbrush, a cordless razor, or the like, is charged by a principle of electromagnetic induction. In recent years, wireless charging products capable of charging portable devices such as mobile phones, PDAs, MP3 players, notebook computers, or the like, using the electromagnetic induction have been released.

However, the magnetic induction scheme inducing current through magnetic field from a single coil to another coil is very sensitive to a distance between the coils and a relative position of the coils to sharply degrade transmission efficiency even when the distance between two coils are slightly spaced or twisted from each other. Therefore, the wireless charging system according to the magnetic induction scheme may be used only in a short range of several centimeters or less.

Meanwhile, U.S. Pat. No. 7,741,734 discloses a method of wireless non-radiative energy transfer using coupling of resonant-field evanescent tails. The basis of this technique is that two same-frequency resonant objects tend to couple, while interacting weakly with other off-resonant environmental objects, which makes it possible to transfer energy farther away compared to the prior art magnetic induction scheme.

There are the complexity and inconvenience of wire cable chargers by transferring power wirelessly.

SUMMARY

This invention provides management protocols for wireless power transfer to multiple devices in Multi-device Wireless Power Management System. Various functions of Multi-device Wireless Power Management System are justified from this invention. The WPT frames and messages which work between the management block of a charger and the management block or the coupler block of a device, or the coupler block of a charger are defined as well to execute various functions. Also the procedures for each functionality are described based on its frames and messages.

This invention defines management protocols for wireless power transfer to multiple devices in Multi-device Wireless Power Management System. Various functions of management protocols are justified from this invention. The frame format and the messages are defined as well to execute functions. Also the procedures for each functionality are described based on its frame format and messages.

BRIEF DESCRIPTION OF THE DRAWINGS

FIG. 3 is a diagram illustrating UCID structure.
FIG. 4 is a diagram illustrating Frame format.
FIG. 5 is a diagram illustrating Data frame format.
FIG. 6 is a diagram illustrating Acknowledgement frame format.
FIG. 7 is a diagram illustrating Payload format of data frame.
FIG. 8 is a diagram illustrating Block format of device status request.
FIG. 9 is a diagram illustrating Block format of WPT request.
FIG. 10 is a diagram illustrating Block format of coil control request.
FIG. 11 is a diagram illustrating Block format of Group ID set-up request.
FIG. 12 is a diagram illustrating Block format of inter-device WPT request.
FIG. 13 is a diagram illustrating Block format of connection response.
FIG. 14 is a diagram illustrating Block format of device status response.
FIG. 15 is a diagram illustrating Block format of WPT response.
FIG. 16 is a diagram illustrating Block format of coil control response.
FIG. 17 is a diagram illustrating Block format of Group ID set-up response.
FIG. 18 is a diagram illustrating Block format of inter-device WPT response.
FIG. 19 is a diagram illustrating Block format of COM ID notification.
FIG. 20 is a diagram illustrating Block format of WPT ID notification.
FIG. 21 is a diagram illustrating Block format of WPT mode notification.
FIG. 22 is a diagram illustrating Block format of WPT schedule notification.
FIG. 23 is a diagram illustrating Block format of WPT termination request.
FIG. 24 is a diagram illustrating Block format of full charge notification.
FIG. 25 is a diagram illustrating Block format of discharge rate variation notification.

DETAILED DESCRIPTION OF EMBODIMENTS

Figure 1:
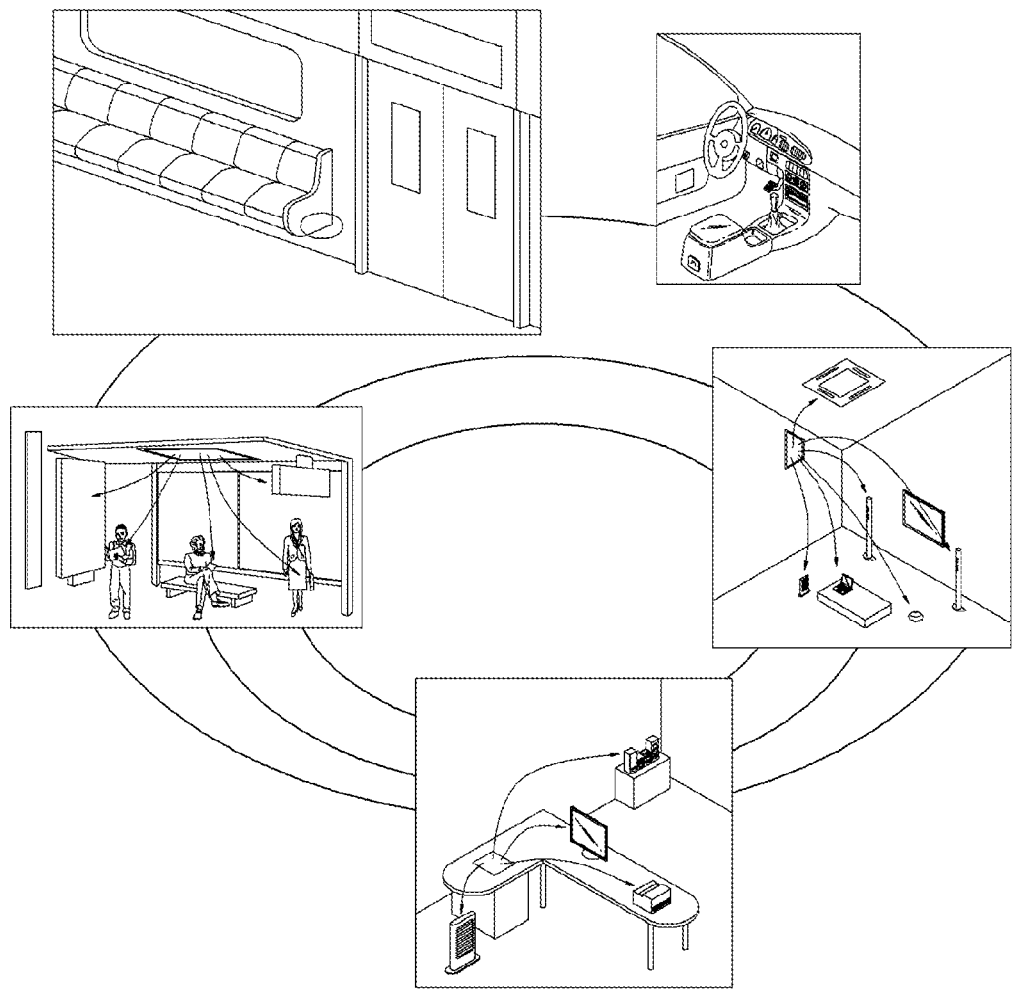
FIG. 1 is a diagram illustrating Concept diagram of MWPMS services.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

Management Protocol of Wireless Power Transfer for Multi-Devices

1. Scope

This item defines management protocols for wireless power transfer to multiple devices in Multi-device Wireless Power Management System. Various functions of Multi-device Wireless Power Management System are justified from this item. The WPT frames and messages which work between the management block of a charger and the management block or the coupler block of a device, or the coupler block of a charger are defined as well to execute various functions. Also the procedures for each functionality are described based on its frames and messages.

2. Normative References

None

3. Terms, Definitions and Abbreviations

For the purposes of this document, the following terms, definitions, and abbreviations apply.

3.1. Terms and Definitions 3.1.1. Multi-Device Wireless Power Management System (MWPMS)

The system of management protocol that is capable of providing wireless power transfer from a charger to either one or multiple the power receivers.

3.1.2. Multi-Device Wireless Power Charger (MWPC)

The wireless power transmitter which can transfer power wirelessly to a number of multi-device wireless power receivers.

3.1.3. Multi-Device Wireless Power Receiver (MWPR)

The wireless power receiver which can receive power from the multi-device wireless power charger 3.1.4. Wireless Power Transfer (WPT)

The technology that enables power transfer without physical contact from a source to its destination in distance.

3.1.5. Wireless Power Transfer Management Protocol (Management Protocol)

WPT management protocol is to communicate and control for various types of multi-devices in terms of wireless power transfer.

3.1.6. Wireless Power Transfer Frame (Frame)

The frame exchanges the data between MWPC MGMT and MWPR MGMT which is for the application layer.

3.1.7. Message

The message exchanges information between MGMT block and APP block, MGMT block and Coupler block, APP block and MAC. Coupler block is a part which controls Coupler.

3.2. Abbreviations

For the purposes of this document, the following abbreviations apply:

ABNR Abnormal
API Application Programming Interface
APP Application
CMTA Charger Management To Application
CMTC Charger Management To Coupler
Dev Receiver
Dev_ID COM ID
Dst Destination
ELGB Eligibility
Freq Frequency
IDWPT Inter-Device Wireless Power Transfer
MAC Medium Access Control
MaxPwr Maximum Power
MGMT Management
ModeReq Mode Request
ModeRes Mode Response
MTM Mgmt to Mgmt
MWPMS Multi-device wireless Power Management System
MWPC Multi-device wireless Power Charger
MWPR Multi-device wireless Power Receiver
PHY Physical
Pwr Power
Req Request
Res Response
RSSI Received Signal Strength Indicator
Req_Join Connection Request
RX Receiving
RxPwr Received Power
SCHDL Scheduling
Src Source
TX Transmitting
UCID Unique Coupler ID
WPT Wireless Power Transfer 4. Overview MWPMS is a system of management protocol for wireless power transfer to a number of receivers. WPT is a technology that breaks free of conventional charging method via wired cable. It utilizes the characteristics of magnetic field or electric field to deliver power in distance. In the market, there is a large number of wireless charging devices, which each of them are designed under various kinds of protocols not interoperable. The inconvenience it causes to users could cost a large sum of economics, and non-economic expenditure, unnecessary. MWPMS aims to provide consumers of wireless charging devices an option to be able to fully utilize a system that is compatible with a number of existing technologies. Also to break away from conventional 1:1 wireless charging, MWPTS will be managing power transfer to multiple receivers at a time, using various charging modes.

The MWPMS technology can be applied to the following industry fields and more that require constant power supply.

Mobile terminals: Charging services can be provided within mobile terminals anytime and anywhere.

Home appliances: To make entangled cable mess neat and convenient, the use of MWPMS technology can offer the benefits of minimal wiring and freedom to furniture arrangement.

Figure 2:
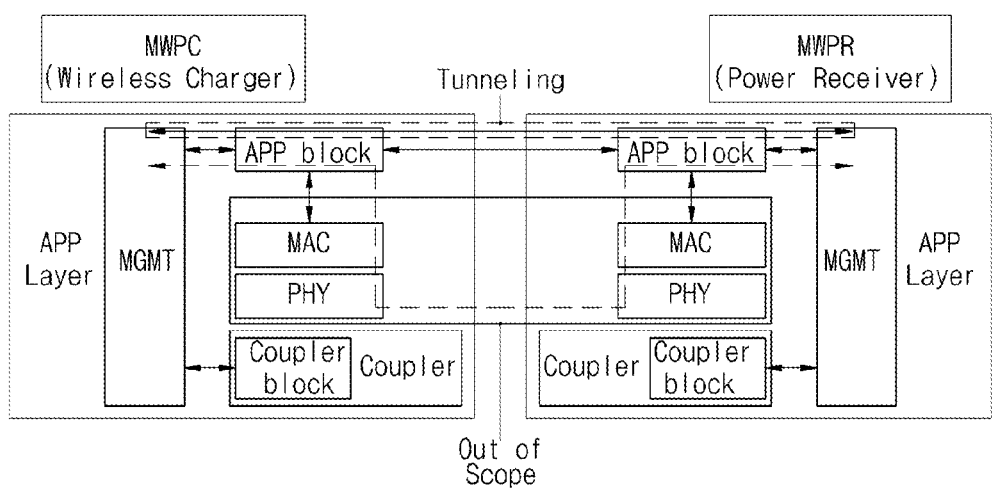
FIG. 2 is a diagram illustrating MWPMS structure.
Figure 26:
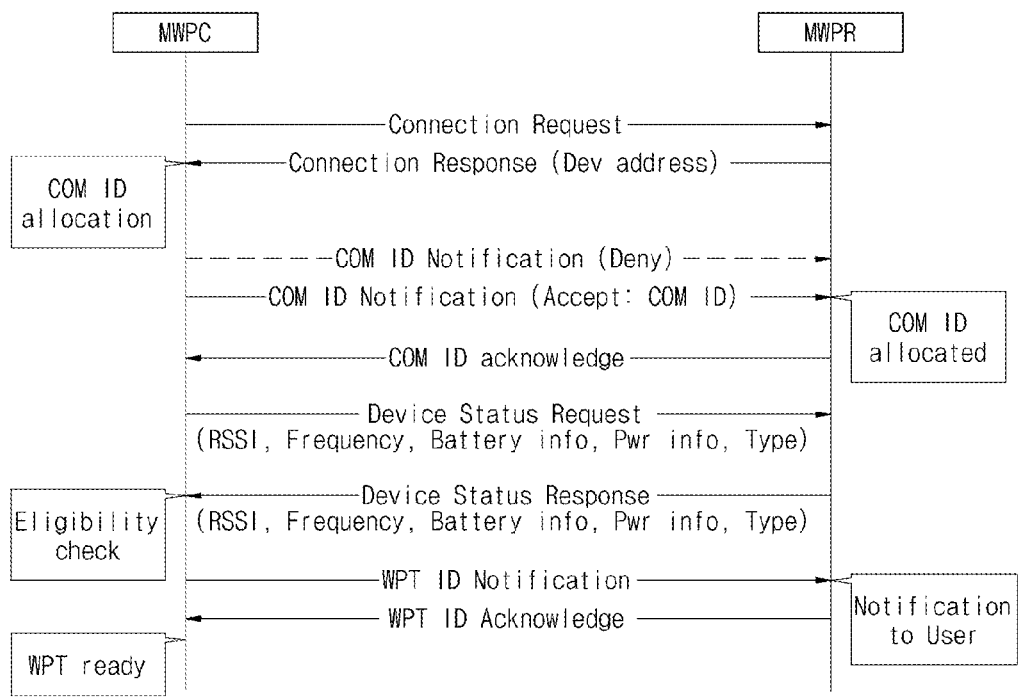
FIG. 26 is a diagram illustrating Association procedure.
Figure 27:
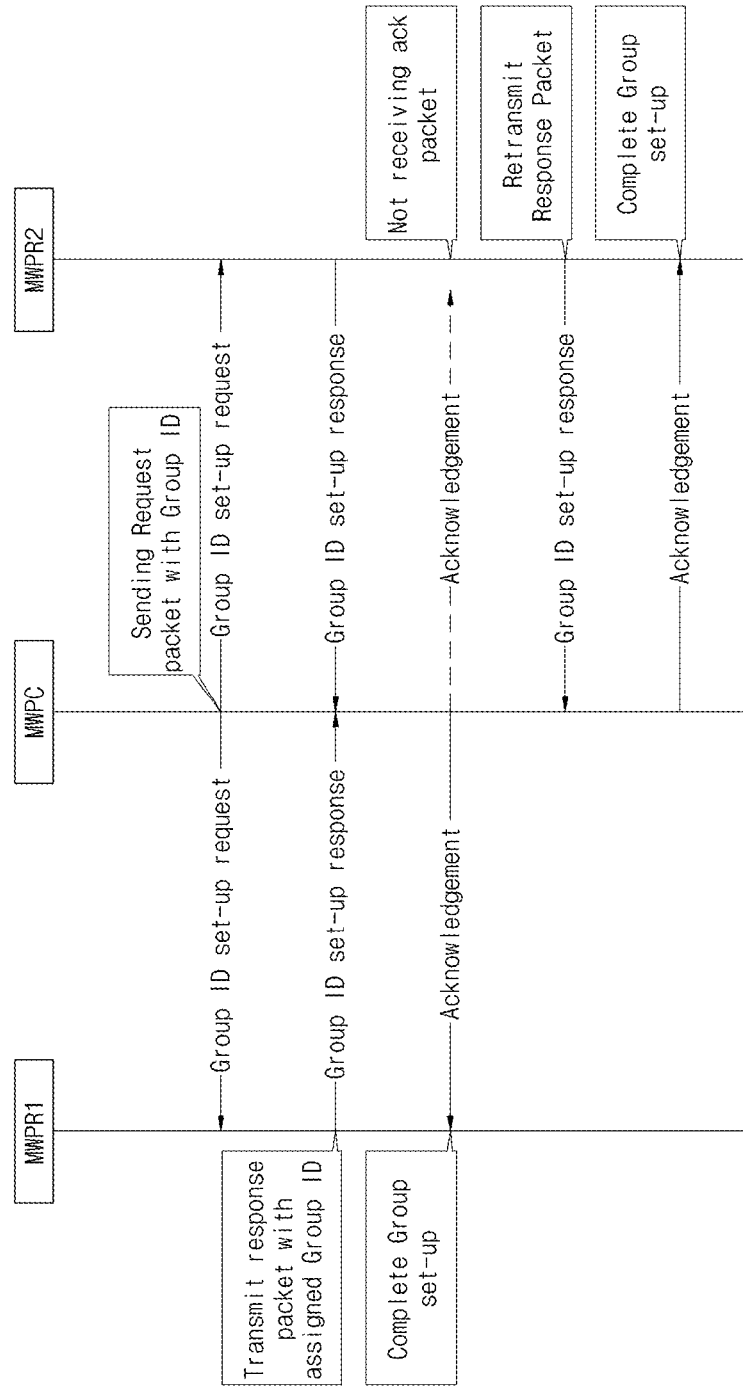
FIG. 27 is a diagram illustrating Group-ID set-up procedure.
Figure 28:
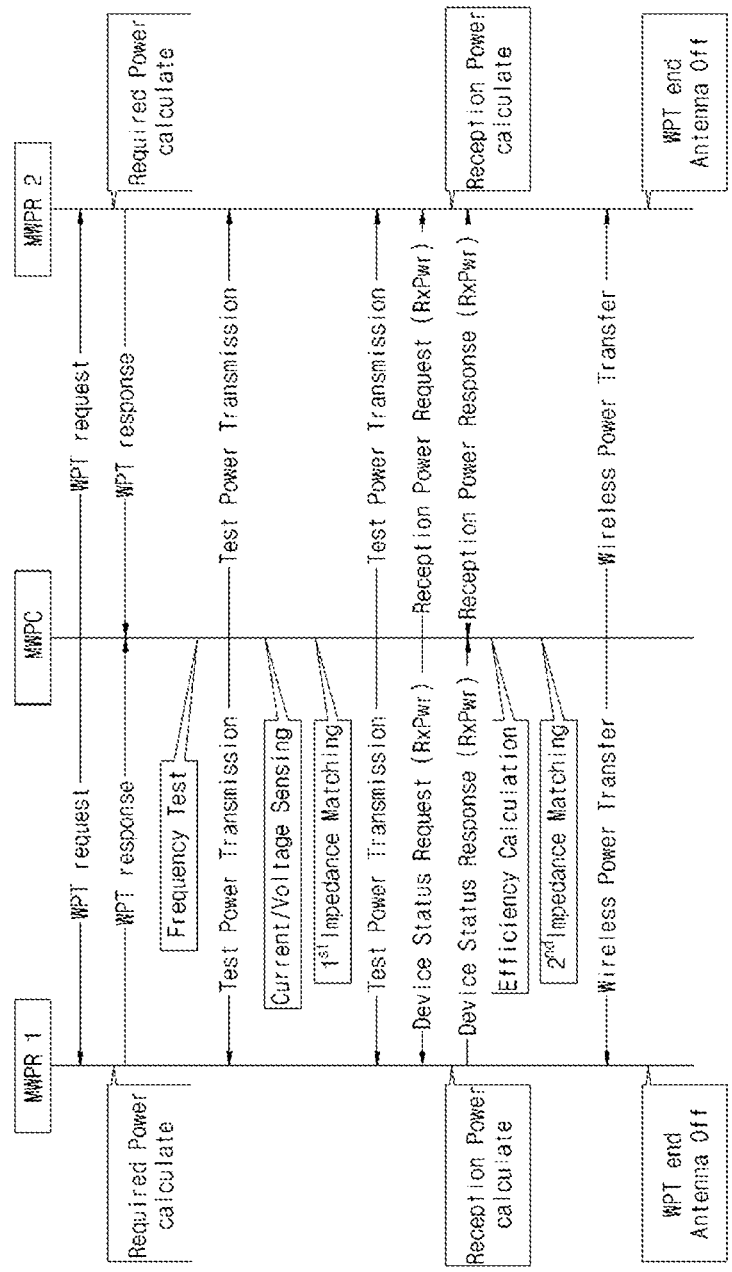
FIG. 28 is a diagram illustrating Simultaneous charging.
Figure 29:
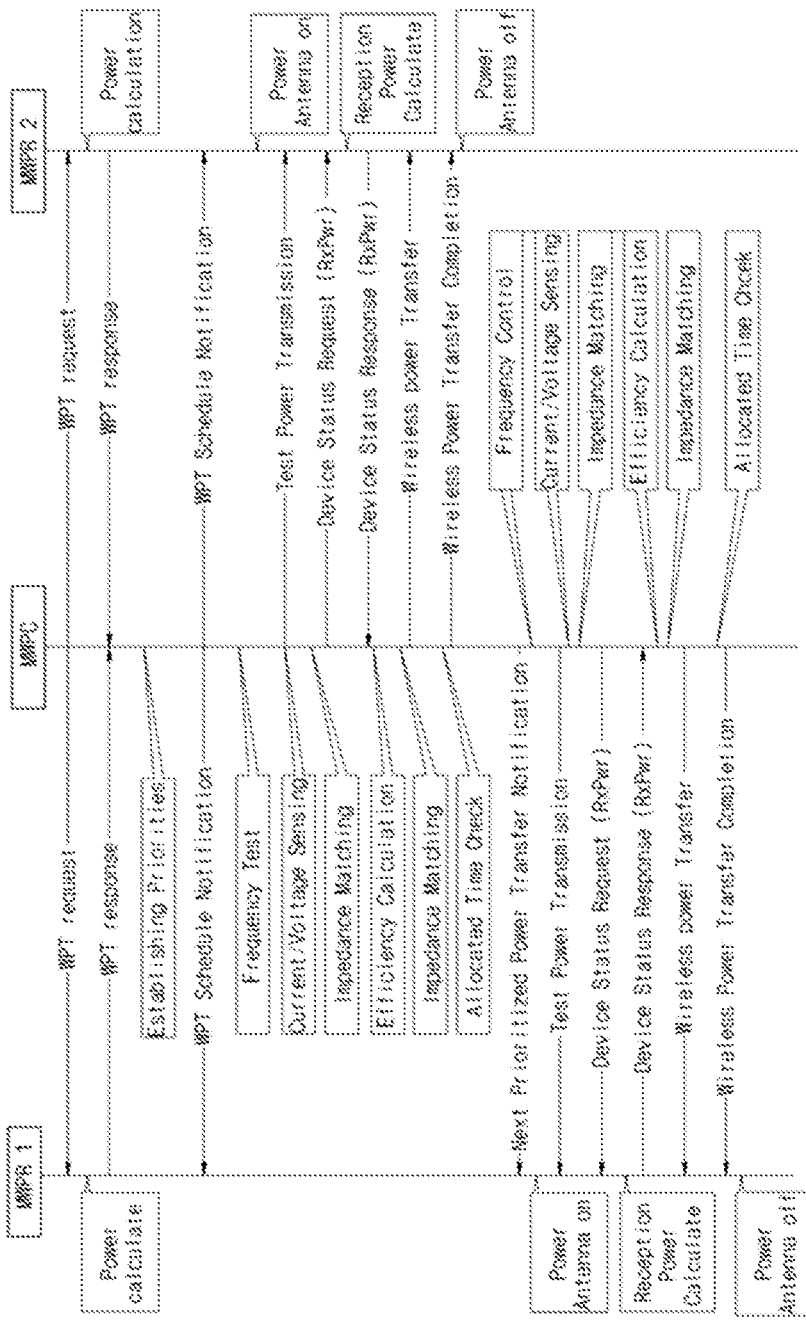
FIG. 29 is a diagram illustrating Sequential charging.
Figure 30:
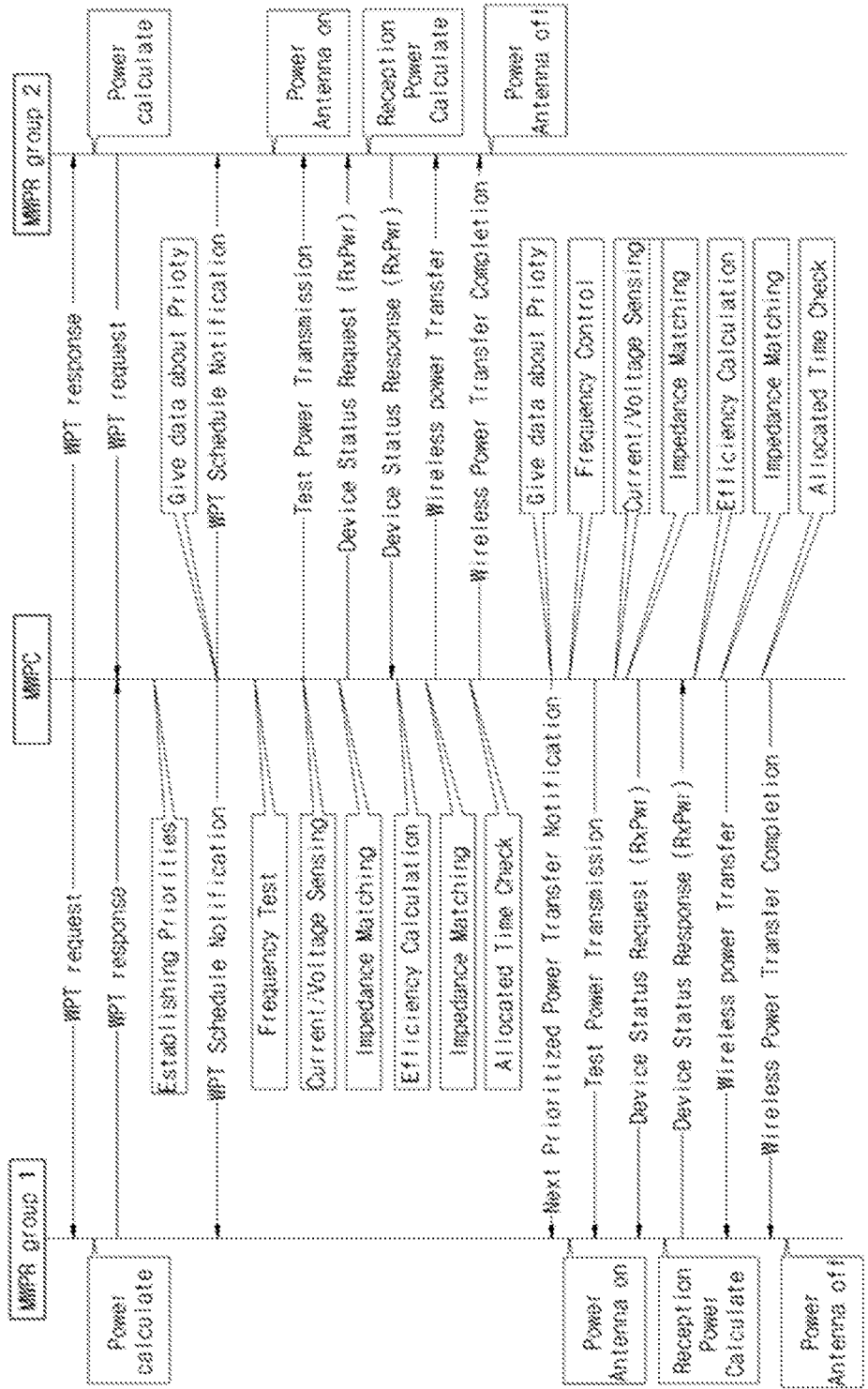
FIG. 30 is a diagram illustrating Foaming charging.
Figure 31:
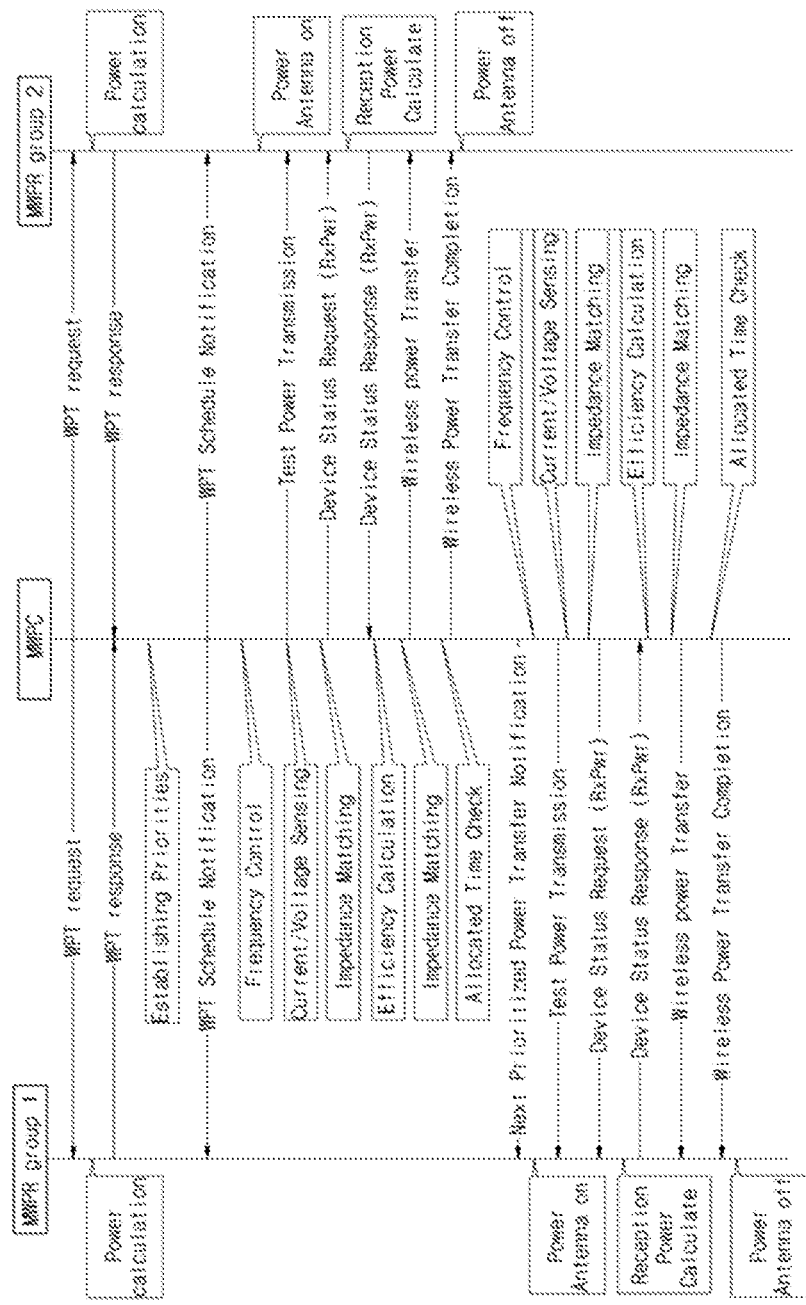
FIG. 31 is a diagram illustrating Compound charging.
Figure 32:
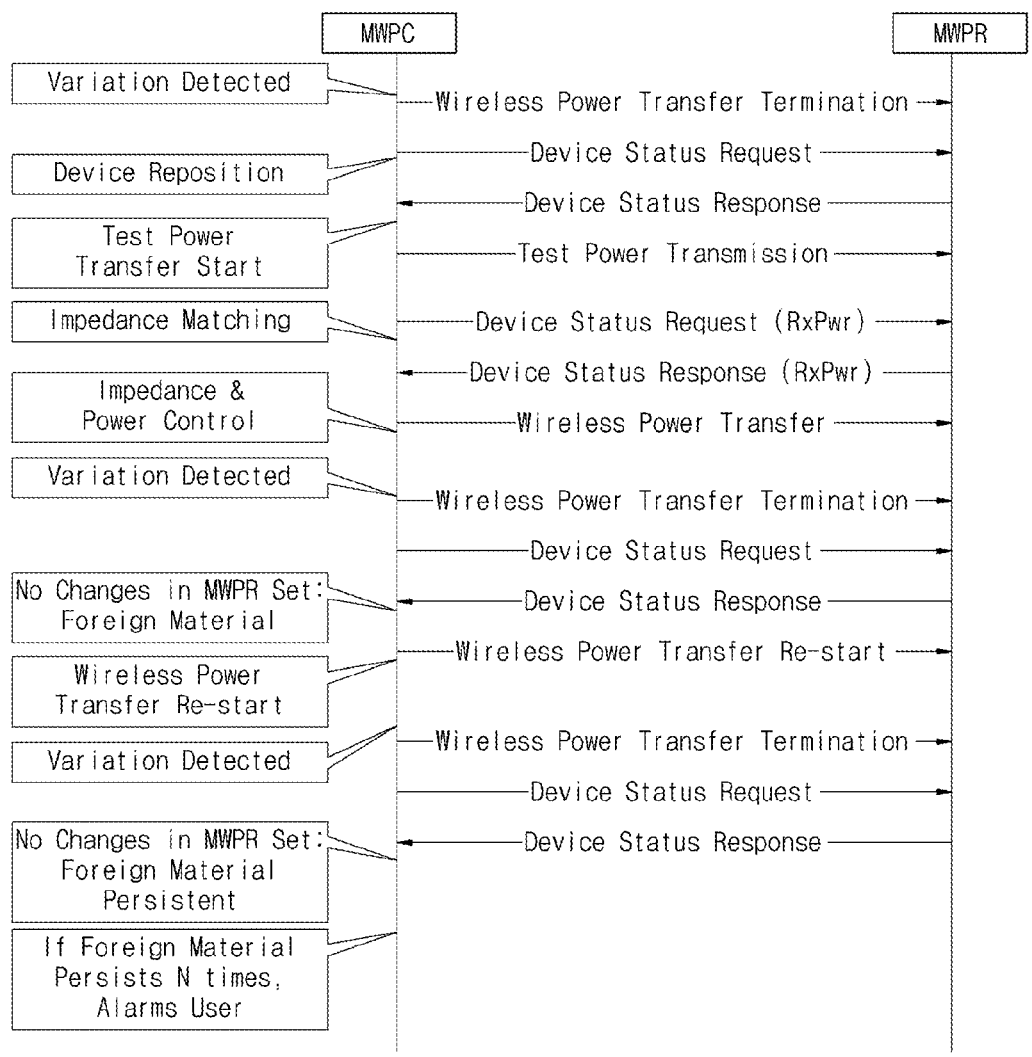
FIG. 32 is a diagram illustrating Charger status detection.
Figure 33:
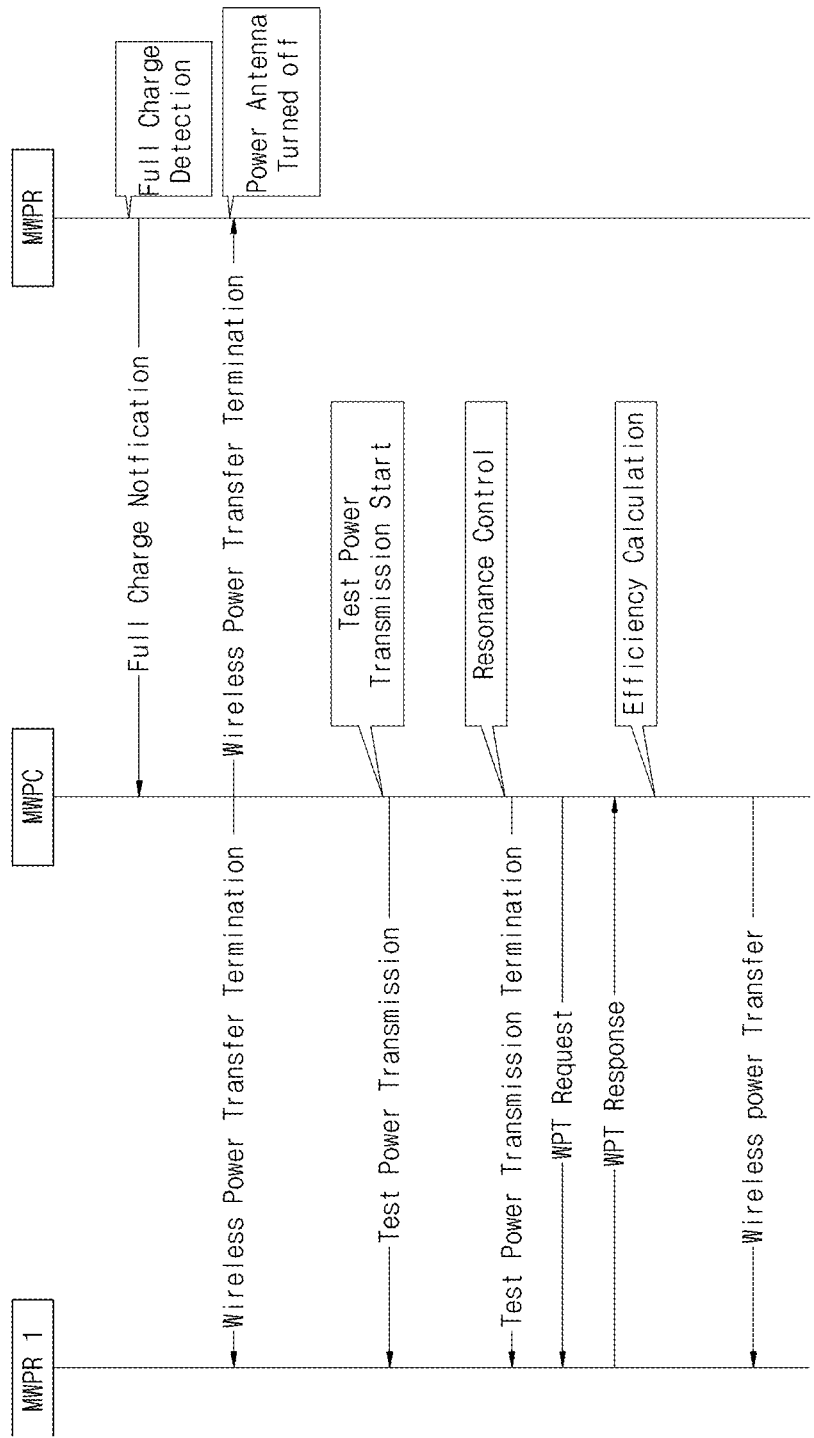
FIG. 33 is a diagram illustrating Full charge detection.
Figure 34:
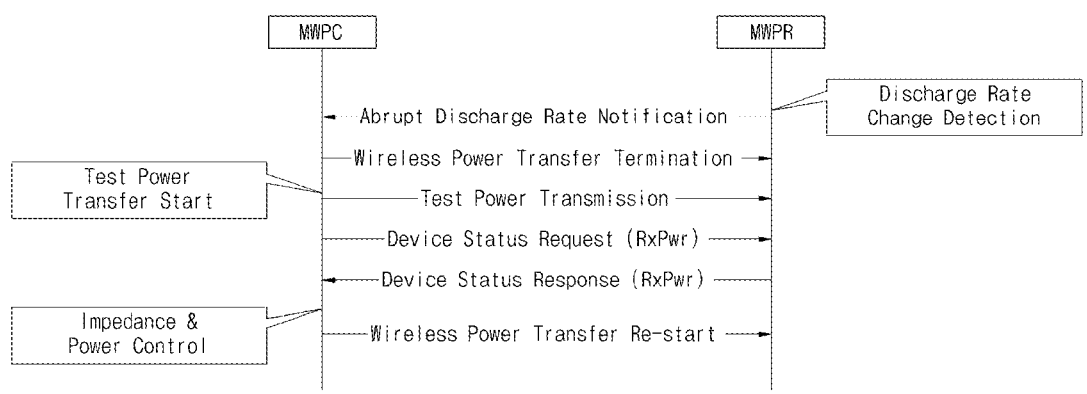
FIG. 34 is a diagram illustrating Discharge rate variation detection.
Figure 35:
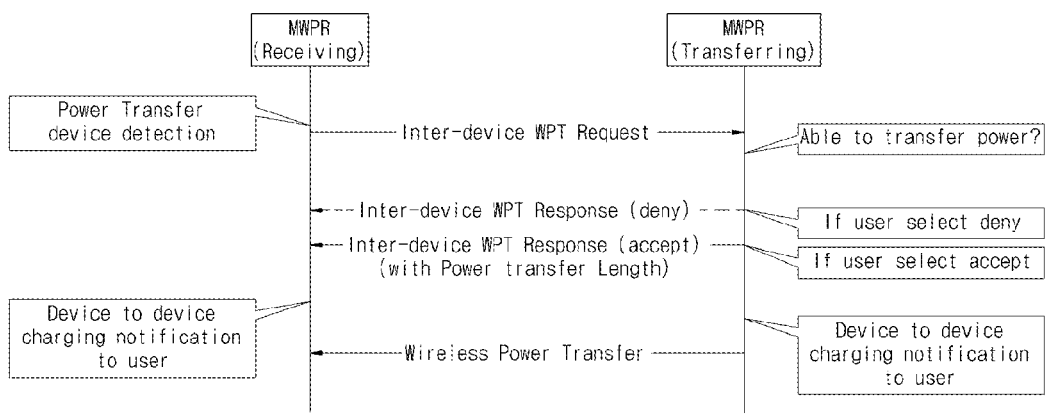
FIG. 35 is a diagram illustrating Inter-device charging.
Figure 36:
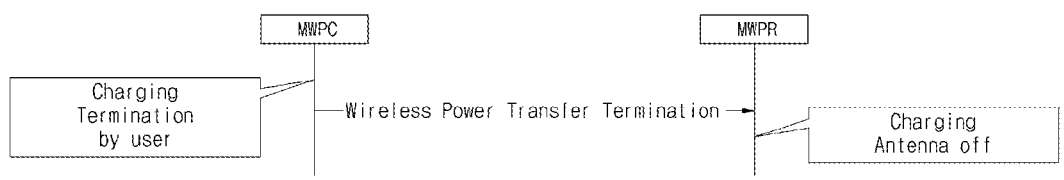
FIG. 36 is a diagram illustrating Termination.
Figure 37:
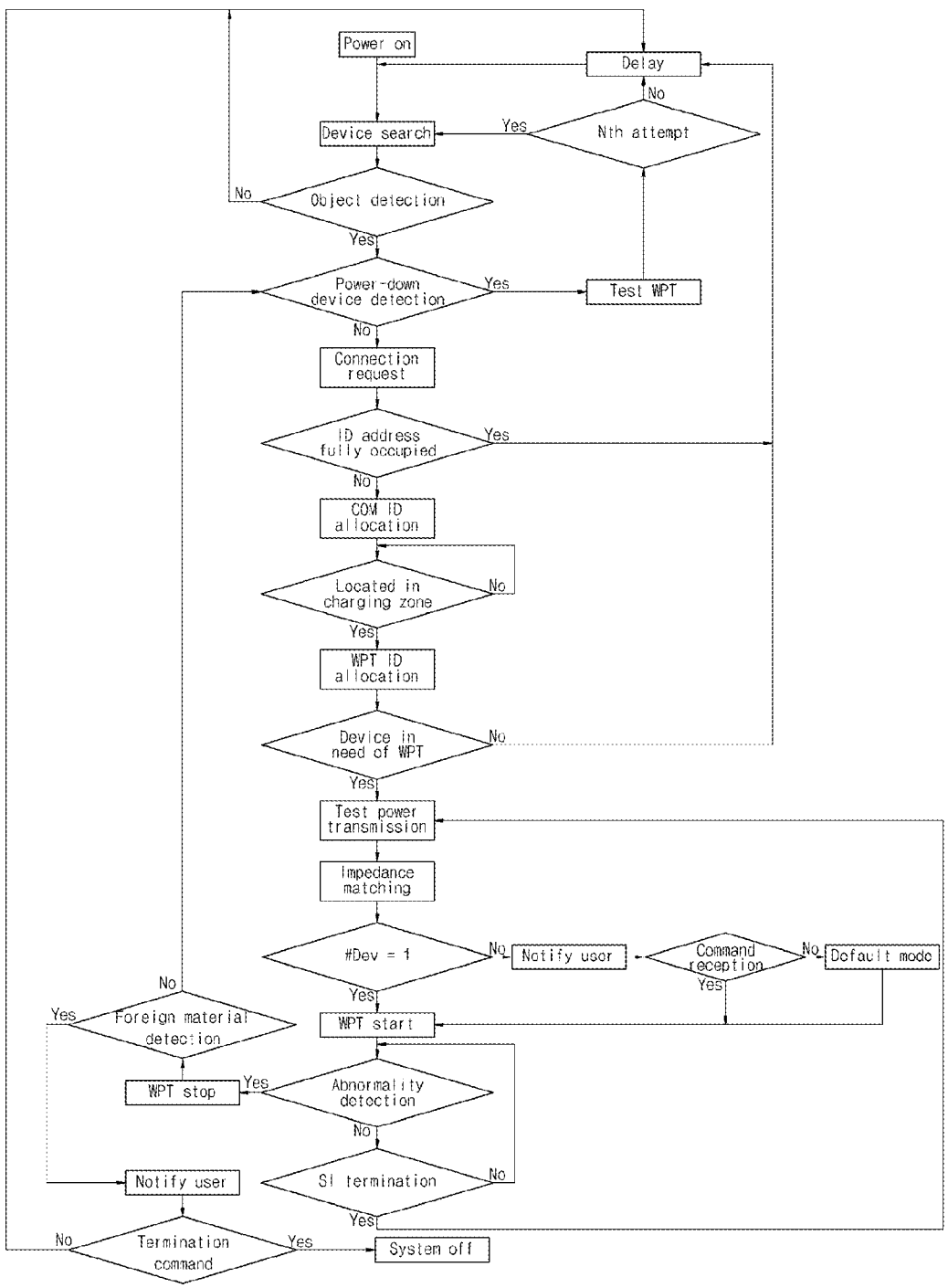
FIG. 37 is a diagram illustrating Charger flow chart.
Figure 38:
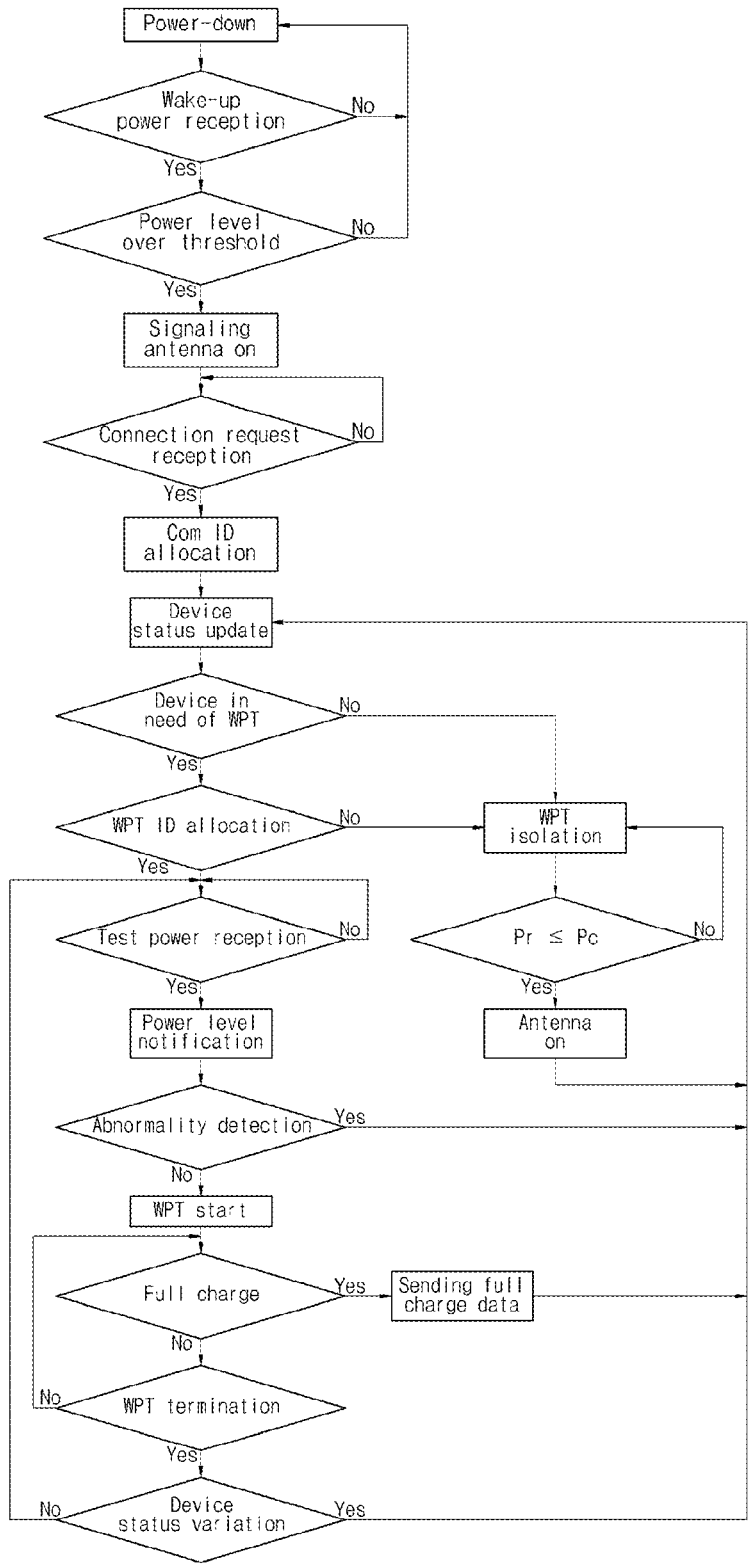
FIG. 38 is a diagram illustrating Receiver flow chart.
Figure 39:
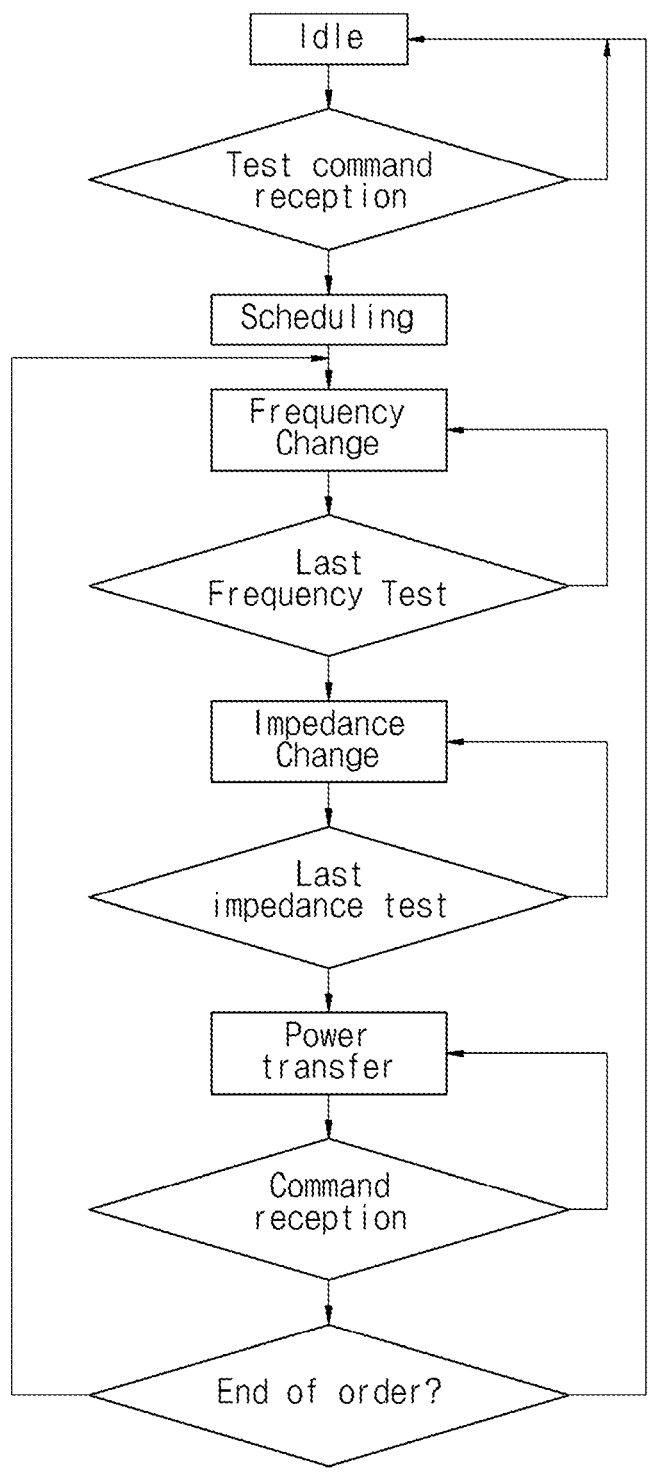
FIG. 39 is a diagram illustrating Wake-up WPT.
Figure 40:
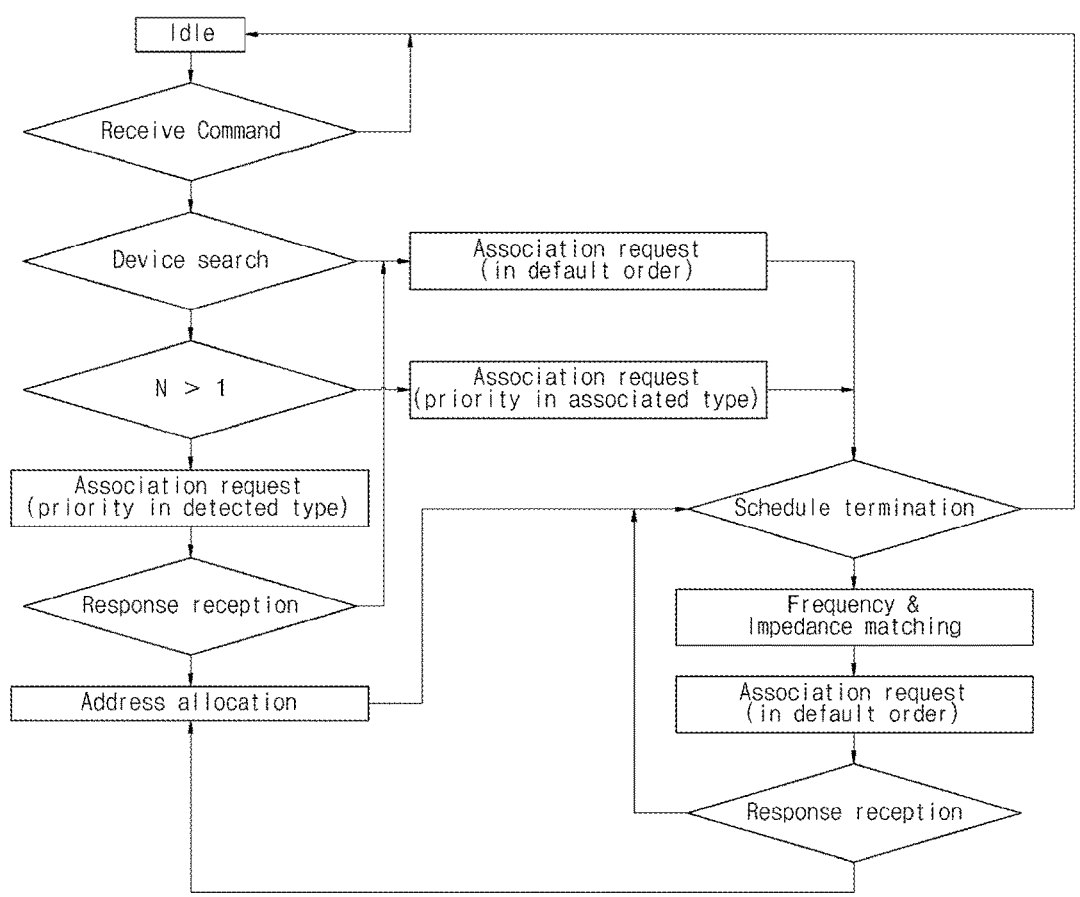
FIG. 40 is a diagram illustrating Device search.
Figure 41:
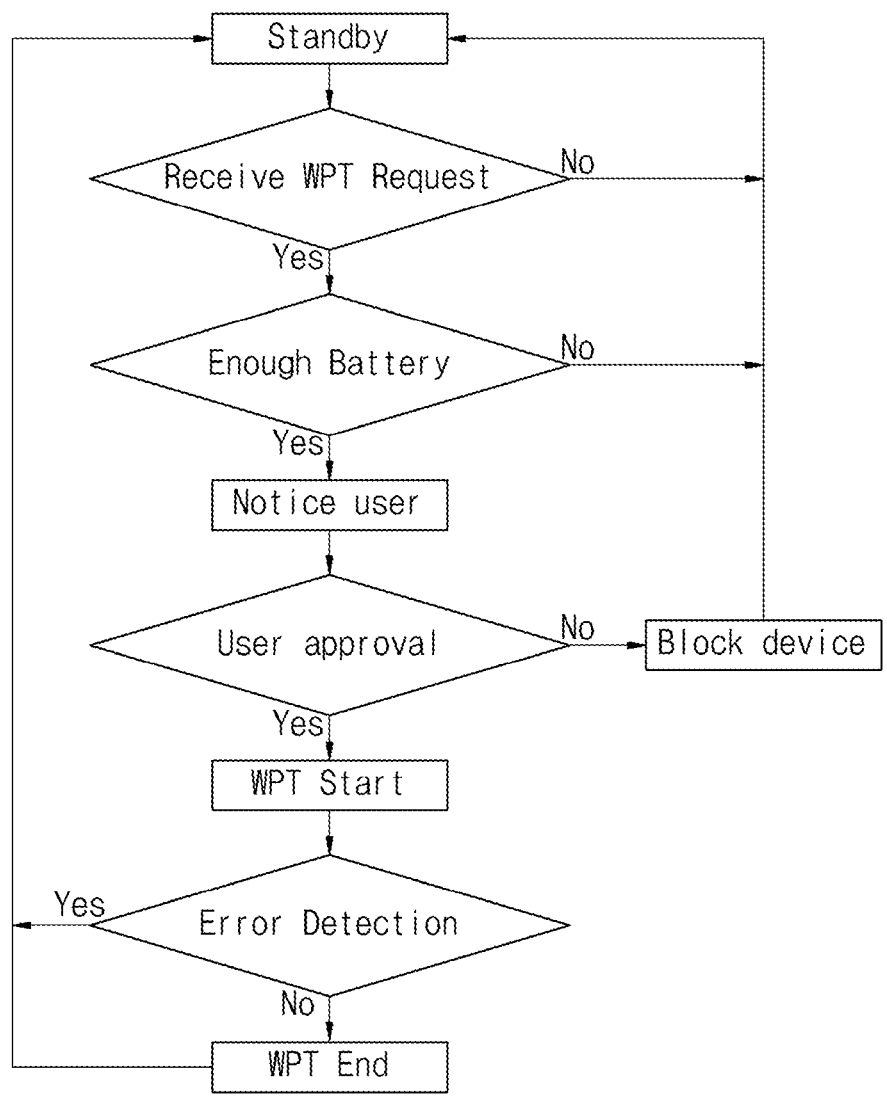
FIG. 41 is a diagram illustrating Inter-device charger flow chart.
Figure 42:
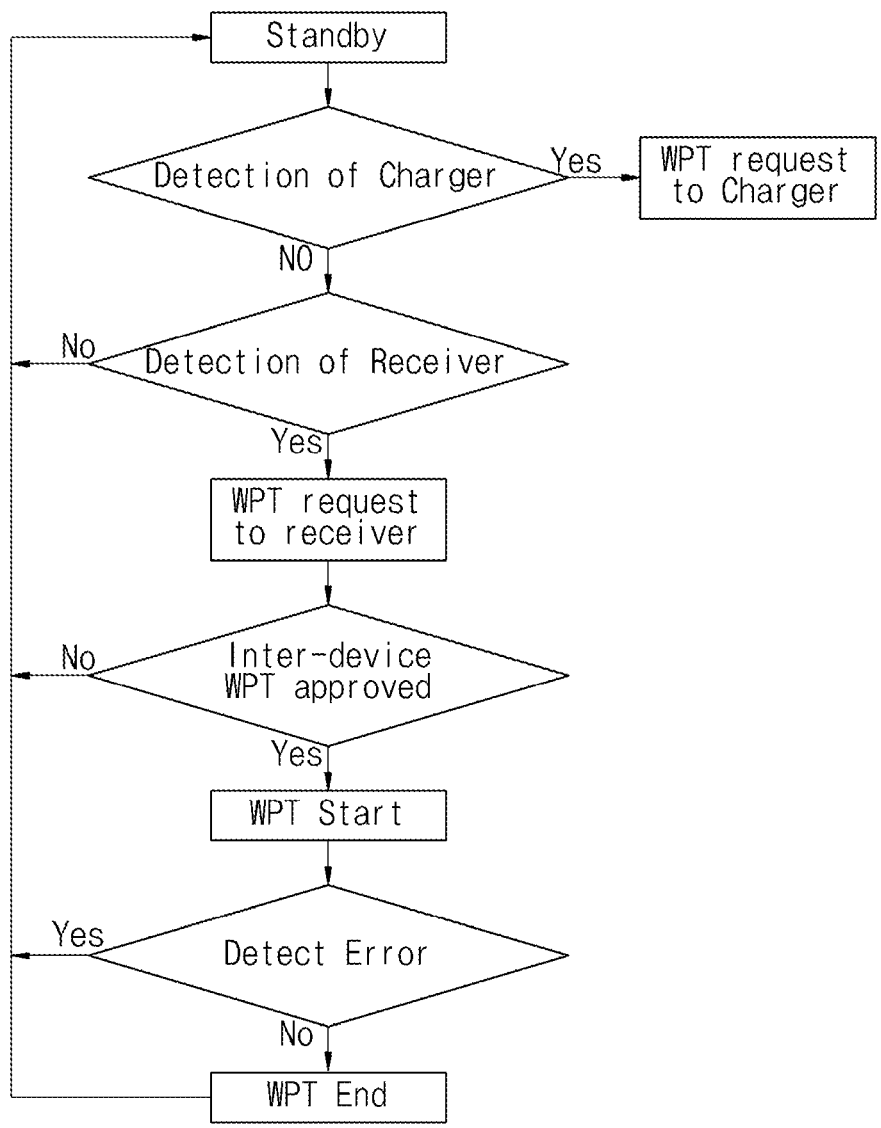
FIG. 42 is a diagram illustrating Inter-device receiver flow chart.

In order to provide effective WPT to multiple receivers, a proper management protocol must be thoroughly structured as in FIG. 2. Then multi-device wireless power charger (MWPC) will be able to control multi-device wireless power receivers (MWPRs) for efficient wireless power transfer process, regardless of MAC and PHY types. Under the structure of MWPMS, it will be able to incorporate both out-band WPT system, which uses wi-fi, bluetooth, zigbee, etc., and in-band WPT system, which uses MFAN, NFC, RFID, etc. . . . . The multi-device wireless power management system will have following system structure:

For efficient wireless power transfer and interoperability, users can select various frequency bands. In order to efficiently provide WPT services to multiple receivers, a proper signalling system is required; it shall be incorporated for the exchange of power transfer data and control signals. For the compatibility of wireless power transfer, users may select various frequency band for power transfer as well.

Within MWPMS range, MWPC can provide power transfer from several watts to several hundred watts. The closer the distance between charger and receiver, the efficiency becomes greater. As shown in FIG. 1, provided that enough infrastructure is installed, ubiquitous charging environment is settled.

Functions like optimal power transfer mode selection are included for the best power transfer efficiency. Also MWPMS interface includes emergency controls that provide counter-measures to such contingencies as sudden MWPR detection and disappearance. General wireless power transfer environment is controlled by MWPC, which manages connection, separation, and release of MWPRs.

5. Functionalities 5.1 General

In order to design a management protocol that can construct reliable and efficient wireless power transfer system for multiple receivers, it needs to include all the fundamental functions, yet not repetitive. In MWPMS, there are two operations for Inter operation: dependant operation and mutant co-operation. Also functions are categorized into six distinctive functions. They are initialization, association, general charging management, abnormal charging management, inter-device charging management, and termination.

5.1. Inter Operation

There are two operations of inter operation, depending on the compatibility with lower layer protocols. If lower layer protocol does not support upper layer, it will undergo dependant operation; if inter operation is compatible with lower layer protocol, it will undergo mutant co-operation.

5.1.1. Dependant Operation

Under dependant operation, charger detects nearby power receiver with physical sensing at a hardware level. Once detected, charger will at least acknowledge of the number and type of power receivers within its range. Charger will manage power receivers only as they are defined in each specification.

5.1.2. Mutant Co-Operation

If MWPMS application is compatible with MAC layer functions, mutant co-operation can be used. In this case, application can communicate with MAC to receive various information from MAC or even deliver an order. As a consequence, charger can manage the entire MWPMS more efficiently. In order to fully utilize mutant co-operation, there must be appropriate adjustments to each specification.

5.2. Initialization

Before a charger can initiate power transfer service to multiple receivers, establishing communication with receivers should precede.

5.2.1. Frequency Band Scan

To identify devices within MWPMS zone, charger periodically broadcasts connection request to match with all receivers of diverse frequency bands. The broadcasting is processed in-band and out-band scan, to support diverse types of receivers.

5.2.2. Initiation Power Transfer

When there is not a single receiver detected from frequency band scan, charger considers the possibility of power-down receiver. To wake up the power-down receiver if there is, a charger periodically transfers initiation power in several frequencies, when there is not a receiver associated to MWPMS. When there are receivers in MWPMS and there is active power transfer going on, it is assumed that the active power transfer will wake up power-down receivers.

5.3. Association

Once receivers have been initiated, they need to be associated by a charger to be properly scheduled for the efficient multi-device power transfer.

5.3.1. Communication Connection

Once receivers are detected from frequency band scan, charger sends connection request to receivers. Receivers that have received connection request will reply back to charger with its address. Charger will check on the received device address, and register the address. Accordingly, charger will allocate COM ID to each receiver.

5.3.2. WPT Eligibility Check

As receiver is connected to MWPMS and allocated to COM ID, charger will request receiver of its device status—frequency, battery information, received signal strength, and so on. Receiver will return information in response data. With the data, charger calculates eligibility with various factors, such as the distance to receivers. Consequently, charger will inform receivers whether they are eligible for charging or not. According to the result of eligibility check, the final candidate for wireless power transfer service will be determined, and receive WPT ID.

5.4. General Charging Management

When more than an authenticated receiver is within MWPMS charging zone, charger initiates wireless power transfer service. Distinctively, there are four modes for power transfer in MWPMS: Simultaneous power transfer mode, sequential power transfer mode, foaming power transfer mode, and compound power transfer mode. User may configure either mode at own favour.

5.4.1. Simultaneous Charging

When there is only a receiver for power transfer, or if the user wishes to transfer power with multiple receivers, simultaneous charging mode will be selected. In this mode, charger broadcasts wireless power to all receivers within the charging zone at the same time. For fine tuning, test power is transferred to receivers before proper power transfer. The efficiency is calculated after receiving reception power level from receivers. Accordingly, a charger calculates optimal impedance matching, and wireless power transfer is performed to all receivers within charging zone. The process continues unless power transfer is terminated.

5.4.2. Sequential Charging

When there are multiple receivers, user may choose to precede wireless power transfer in sequential charging mode. In this mode, charger will divide power transfer period into several time slots, and allocate each time slot to each receiver to maximize power transfer efficiency. Charger will inform power transfer schedule to receivers: when to turn on and off the coupler antenna. For each individual power transfer in each time slots, an optimal impedance matching is carried out for the maximum efficiency. Sequential power transfer cycle is terminated when power transfer of the last time slot is completed.

5.4.3. Foaming Charging

When there are multiple receivers, user may choose to precede wireless power transfer in foaming charging mode. In this mode, power is transferred to multiple receivers, but it is focused onto designated power receiver at a greater efficiency. Charger with received device status, calculates priority and transfers power according to the priority either by sequential and simultaneous charging mode. It can be done by allocating various time divisions, utilizing different number of antenna, and so on. Foaming power transfer cycle is terminated at the same point where simultaneous and sequential charging mode is completed.

5.4.4. Compound Charging

When there are multiple receivers, user may choose to precede wireless power transfer in compound power transfer mode, a combination of simultaneous, sequential, and foaming charging. In this mode, charger may undertake power transfer with various characteristics. It may allocate a group of receivers in a time slot, or give a primary order while in simultaneous charging, at users' command. Compound power transfer cycle is terminated at the same point where simultaneous and sequential charging mode is completed.

5.5. Abnormal Status Management

During wireless power transfer, the service stops immediately to resolve any abnormality within system, if any abnormal situation is detected. The abnormal situation is categorized into charger detection and receiver detection.

5.5.1. Charger Status Detection

Charger constantly measures voltage and current from the coupler to take appropriate counter actions when a sudden variation is detected. When voltage/current variation is detected, charger cuts power transfer immediately to investigate the cause. It will either be of receiver set distortion or foreign material detection

5.5.1.1. Device Reposition

When power transfer is stopped after voltage/current variation detection, a charger firstly considers the case of receiver appearance or disappearance: charger will send device status request to receivers. If new receiver responds to the request, or if existing receiver does not respond, a charger considers the abnormal situation was due to receiver set distortion. Charger will re-calculate optimal impedance matching to start new set of wireless power transfer.

5.5.1.2. Foreign Material Appearance

When all receivers have responded to device status request after voltage/current variation detection, charger will know that the receiver set has not been changed. If the voltage/current variation is not from the receiver set distortion, it has to be from the foreign material. Since the foreign material could be temporary, charger will initiate another power transfer service, acknowledging that there is a foreign material. If the foreign material is temporary and removed, the voltage/current variation will return to previous level; if the foreign material is persistent and influences negative impact in power transfer, charger will inform the user of it.

5.5.2. Receiver Status Detection

Receiver constantly measures its own power level for any abnormal situations. When it detects abrupt variation in discharge rate or full charge alert, receiver reports situation to charger to exit from wireless power transfer.

5.5.2.1. Discharge Rate Variation

When receiver starts to run various operations and discharge rate changes drastically, the receiver informs charger of it. Charger immediately cuts wireless power transfer to recalculate proper power level to be transferred. When the adjustment is finished, wireless power transfer is re-started at an appropriate level.

5.5.2.2. Full Charge

When receiver is fully charged from the wireless power transfer, receiver informs charger of it. Charger will command the receiver to turn off power antenna, and recalculate schedule without the fully charged receiver. The same procedure applies afterward.

5.6. Inter-Device Charging Management

Certain wireless power receivers are able to carry out basic functions of wireless power transfer. In that case, inter-device power transfer becomes possible. When charger does not exist within the range of receiver, it may request power supply from nearby receivers that are using the same type of protocol, and that are capable of performing wireless power transfer. Upon the request, power transferring receiver informs its user of the request. If the user approves, simultaneous power transfer on 1:1 basis is performed until it goes timeout, or the user commands termination.

5.7. Termination

Upon the command of user, wireless power transfer will be terminated any time by charger. Charger will cut off wireless power transfer; receivers will wait for the requests when charger is ready for the next wireless power transfer.

6. Protocols

6.1. General

For an efficient wireless power transfer, relevant information should be well communicated between MWPC and MWPRs. The overall process is carried out in diverse frame format, which control and manage MWPMS receivers. Actual communication messages are sent in such formats. Universal compatibility of the format under the lower level of osi layer is assumed to begin with. It operates on the basis of time-division; if lower layer protocol does not support TDMA (if supporting primitive does not exist), there should be an appropriate programming for similar tasks to make it work at a lower layer.

6.2. ID Structure

6.2.1. Unique Coupler ID

UCID consists of 8 bytes. It is unique ID allocated to coupler. MWPMS uses UCID to identify individual receiver to allocate device ID. It is large in size, so UCID is used only to be allocated of device ID or, when receiver needs to communicate without device ID allocation. It consists of group ID, IC manufacturer's code and serial number.

6.2.2. Group ID

PMS devices can be grouped by applications. Group ID is the identifier for the grouped devices within the network. Charger can request a response to a specific device group in order to mitigate the packet collision. Some group IDs are reserved in Table 1. Its value is defined by user to distinguish groups.

TABLE 1

| Reserved group ID | | |
|---|---|---|
| Group ID | Content | Remarks |
| 0xFF | All groups | When selecting all groups |
| 0xF0-0xFE | Reserved | — |

6.2.3. Power Management System ID

PMS ID consists of 1 byte. It is allocated by charger, only; it is used to distinguish chargers themselves from each other when there are several chargers nearby. PMS ID is always used with device ID.

6.2.4. Device ID

Device ID consists of 1 byte. It is allocated to every connected receiver. There are two types of device ID: COM ID for communication and WPT ID for charging.

TABLE 2

| ID structure | |
|---|---|
| ID field | Type |
| 0XXXXXXX | COM ID |
| 1XXXXXXX | WPT ID |

6.2.4.1. COM ID

ID allocated when firstly connected within communication zone.

6.2.4.2. WPT ID

ID allocated with COM ID. Receiver with COM ID will be allocated of WPT when the receiver is within charging zone, and ready for power reception.

6.3. Frame Format

For the definition of frame format below, it is frame format which is used for application layer in the system. In addition, for frame format in low layer like Mac layer and Physical layer, it is followed by its specification.

For MWPMS receivers to communicate effectively, the following frame structure shown in Table1 is used. It is composed of frame header and frame body. Data for wireless power transfer is transmitted in such a format.

6.3.1. Frame Header

Frame header consists of information related to the control and management of MWPRs. It includes fields for source ID (Src ID), destination ID (Dst ID), type, sequence number, and payload length. The information located in frame header contains general information about the frame, but actual data.

6.3.1.1. Source PMS ID 1 byte of Src PMS ID is used for the address of PMS to distinguish from which system the frame is transferred.

6.3.1.2. Source ID 1 byte of Src ID is used for the address of charger to distinguish where the frame is transferred from.

6.3.1.3. Destination PMS ID 1 byte of Dst PMS ID is used for the address of PMS to distinguish to which system the frame is transferred.

6.3.1.4. Destination ID 1 byte of Dst ID is used for the address of receivers to distinguish where the frame is transferred from. If the number of MWPR is 0x7F or 0xFF, it indicates that the frame is broadcasted to all MWPRs.

6.3.1.5. Frame Type 1 byte of type field is used to distinguish the type of frame; refer to 6.4 for the detailed information on frame type.

6.3.1.6. Sequence Number 1 byte of sequence number field is allocated to each consecutive code frame to prevent frame loss during message transfer.

6.3.1.7. Payload Length 1 byte of payload length field indicates the length (0 to 255 Bytes) of the payload field followed by the payload length.

6.3.2. Frame Body

Frame body consists of information related to the actual data. It includes fields for payload, CRC. The actual data is located within payload, and CRC checks for any errors in payload.

6.3.2.1. Payload

The payload field is variable in length (0 to 15 Bytes) to include actual data required for WPT; refer to 6.5 for detailed information on payload format.

6.3.2.2. CRC

The CRC field (1 Byte) is used to check whether the frame body has been received without error. The standard generator polynomial creating the frame test sequence is as follows:

$$G(x)=x^8+x^6+x^4+1$$

6.4. Frame Type

There are two types of frame as described below from Table 3: data frame, and acknowledgement frame. They are distinguished, as payload structure for each frame type is different. Details of payload can be found from 6.5.

TABLE 3

| Frame type value | | |
|---|---|---|
| Frame Type | Value | Content |
| Data Frame | 0x00 | Used to send request, response, and notification. |
| Acknowledgement frame | 0x01 | Used to confirm the receipt of certain frames. |
| Reserved | 0x02~0xFF | |

6.4.1. Data Frame

The data frame is used in general situation. All the request, response, notification are sent in data format.

6.4.2. Acknowledgement Frame

The payload of the acknowledgement frame informs MWPC of reception by sending only the header with no frame payload to notify reception for relevant data. It can be used for more cases in the future.

6.5. Payload Format

The payload format varies depending on the type of data.

6.5.1. Data Frame

The payload format of the data frame consists of the length, data code, and a number of data blocks as shown in FIG. 6. If the number of MWPRs in the frame header is 0xFF, it indicates frame to be sent to all MWPRs. Each block includes the appropriate data information.

6.5.1.1. Length

The length field (1 Byte) indicates the sum of data block lengths and the field value varies depending on the request block length and the number of blocks.

6.5.1.2. Data Code

The contents for the data code in the payload and data block of the corresponding data code are as follows:

TABLE 4

Data codes

| Category | Code | Code Name | Description |
|---|---|---|---|
| Request | 0x01 | Connection Request | MWPR connection request by MWPC |
| | 0x02 | Device Status Request | Request for all MWPR information |
| | 0x03 | WPT Request | Request for WPT to MWPR |
| | 0x04 | Coil Control Request | Abnormal situation management with coil |
| | 0x05 | Inter-device WPT Request | WPT request to MWPR |
| | 0x06~ 0x4f | Reserved | |
| Response | 0x51 | Connection Response | Response for the connection request of MWPR |
| | 0x52 | Device Status Response | Response for the device status request |
| | 0x53 | WPT Response | Response to WPT request |
| | 0x54 | Coil Control Response | Response for coil control request |
| | 0x55 | Inter-device WPT Response | Response for inter-device WPT request |
| | 0x56~ 0x9f | Reserved | |
| Notification | 0xa1 | COM ID Notification | Notification of whether wireless power transfer of MWPR is eligible or not |
| | 0xa2 | WPT ID Notification | WPT ID allocation, and MWPR's zone notification |
| | 0xa3 | WPT Mode Notification | WPT mode notification |
| | 0xa4 | WPT Schedule Notification | Scheduling information notification |
| | 0xa5 | WPT Termination Notification | Notification of Wireless power transfer termination |
| | 0xa6 | Full Charge Notification | Notification of full charge of MWPR |
| | 0xa7 | Discharge Rate Variation Notification | Notification of variation in discharge rate of MWPR |
| | 0xa8~ 0xef | Reserved | |
| Reserved | 0xf1- 0xff | Reserved | |

6.6. Data Block

All information in MWPMS is transferred in data format. The data is contained in data block. They are categorized and sent as request block, response block, and notification block.

6.6.1. Request Block

Request block is used to request certain action or data from other charger or receiver. There are requests for connection, device status, WPT, coil control, and inter-device WPT.

6.6.1.1. Connection Request

For connection request, block is unnecessary. If frame is sent with connection request code, the connection request is broadcasted.

6.6.1.2. Device Status Request

Device status request block consists of 2 bytes. The first 1 byte is for the COM ID, next 1 byte is for the flag for the containing data. The flag indicates which type of data the charger wishes to receive: RSSI (received signal strength), frequency, battery remain, battery discharge, maximum power level, current power level, product type. If the flag indicates corresponding data to be responded, receiver will send appropriate data (refer to 6.6.2.2) Device status response).

6.6.1.3. WPT Request

WPT request consists of 1 byte. It is for the PMS ID.

6.6.1.4. Coil Control Request

Coil control request block consists of 2 bytes. The first 1 byte is for the COM ID; next 1 byte is for the coil control: 0 if coil needs to stay on, 1 if coil needs to be turned off.

6.6.1.5. Group ID Set-Up Request

Figure 24:
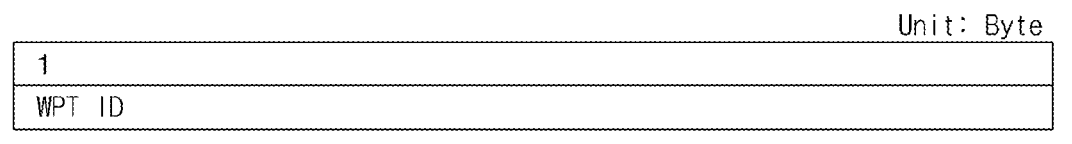

The block format of the Group ID set-up request is shown in FIG. 24. The first 1 bytes are the COM ID, and the last byte is the group ID to be set up.

6.6.1.6. Inter-Device WPT Request

Inter-device WPT request block consists of 9 bytes. The first 8 bytes are for the UCID, and the next 1 byte is for the power required.

6.6.2. Response Block

Response block is used as to responding to request block. There are response for connection, device status, WPT, coil control, and inter-device WPT.

6.6.2.1. Connection response

Connection response block consists of 8 bytes. It is for the UCID.

6.6.2.2. Device status response

Device status response block consists of 8 bytes. First 1 byte is for the flag. The following 1 byte each, total of 7 bytes refers to the flag and contains appropriate data in the corresponding block.

6.6.2.3. WPT response

Coil control block consists of 1 byte. It is for the WPT ID.

6.6.2.4. Coil control response

Coil control block consists of 1 byte. It is for the WPT ID. It has value of 0 for denial, and 1 for acceptance.

6.6.2.5. Group ID set-up response

Figure 17:
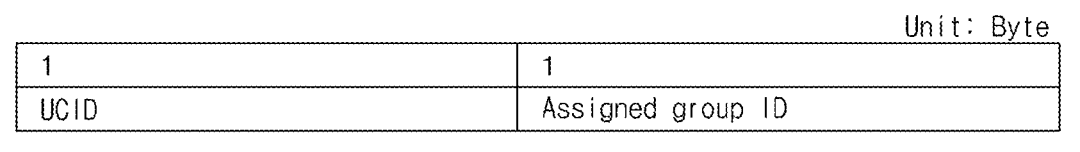

The block format of the Group ID Set-up response is shown in FIG. 17. The group ID set-up data consist of 8 bytes for UCID with the changed group ID and 1 byte for the changed group ID.

6.6.2.6. Inter-Device WPT Response

Inter-device WPT response block consists of 10 bytes. The first 8 bytes are for the UCID, next 1 byte is for the acceptance result: 0 for deny and 1 for accept. The last 1 byte is for the WPT duration in ms.

6.6.3. Notification Block

Notification block allows unilateral data transfer from a charger to a receiver, or a device to a charger.

6.6.3.1. COM ID Notification

COM ID allocation block consists of 2 bytes. The first 1 byte is for the COM ID, next 1 byte is for the acceptance result: 0 is for deny, and 1 is for accept.

6.6.3.2. WPT ID Notification

WPT ID notification block consists of 3 bytes. The first 1 byte is for the COM ID, first next 1 byte is for the WPT ID and the last 1 byte is to distinguish the type of zone: 0 is for communication zone, and 1 is for charging zone.

6.6.3.3. WPT Mode Notification

WPT mode notification consists of 1 byte. It is to distinguish the type of WPT mode: 0 is for sequential, and 1 is for simultaneous.

6.6.3.4. WPT Schedule Notification

Scheduling information notification consists of 3 bytes. The first 1 byte is for the WPT ID, next 1 byte is for the priority: 0 for $2^{nd}$ priority, and 1 for $1^{st}$ priority. The last 1 byte is for the time duration allocated for WPT (ms).

6.6.3.5. WPT Termination Notification

WPT termination notification block consists of 1 byte. It is for the WPT ID.

6.6.3.6. Full Charge Notification

Full charge notification block consists of 1 byte. It is for the WPT ID 6.6.3.7. Discharge Rate Variation Notification Discharge rate variation notification block consists of 3 bytes. The first 1 byte is for the WPT ID, and following 1 byte is for the discharge rate (%/h). The last 1 byte is for the total capacity.

7. Messages
7.1. General

This item also describes on API between Application and APP block, interface between MGMT block and MGMT block, interface between MGMT block and APP block, interfaces between APP layer and MAC layer, and interfaces between MGMT block and coupler block to support MWPMS functions.

7.2. API Between Application and App Block

MWPC APP performs display of power status such as the amount of remaining power and WPT efficiency.

7.2.1. ID Display

The Application sends the received MWPR ID information to the MWPC APP block. After checking the corresponding receiver is eligible to receive WPT, it is informed to the APP block with the required information. The definition of the interfaces is as follows:

```
CMTA-ID.display        {
                         WPT_ID
                         Eligibility,
                       }
```

For the values for the above message, refer to table 4 below

TABLE 5

Value for ID display

| Parameter | Type | Value | Description |
|---|---|---|---|
| WPT_ID | Number | 0x00 to 0xFF | A number is granted to an eligible power receiver. |
| Eligibility | Binary | 0 or 1 | 0: Eligible<br>1: Ineligible |
| Reserved | | | |

7.2.1.1. ID Display Request

After checking WPT eligibility with received the ID information of an MWPR, the MWPC Application sends the ID and eligibility information to the APP block for display. In consequence, the APP block displays the received information.

7.2.2. Power Status Display

When the MWPC Application gathers power status information from every MWPRs, it sends the information to the APP block for display.

```
CMTA-DEV.display       {
                         Frequency,
                         BattRemain,
                         BattDischarge,
                         MaxPwr,
                         RxPwr,
                         Type,
                         RSSI,
                       }
```

For the values for the above message, refer to table 5 below

TABLE 6

Value for power status display

| Parameter | Type | Value | Description |
|---|---|---|---|
| Freq | Number | 30 kHz to 300 MHz | In case of the system that uses multiple wireless power transfer frequency bands, the frequency information to be scheduled to use in the corresponding power transfer. |
| BattRemain | Number | 0% to 100% | Residual battery level of the receiver |
| BattDischarge | Number | 0 to 1000 A | The extent of battery discharge |
| MaxPwr | Number | −50 to 100 dBm | Receiver's acceptable power level |
| RxPwr | Number | −50 to 100 dBm | Received power reception level |
| Type | Description | Receiver type | Description to distinguish the receiver type |
| RSSI | Number | −80 to 100 dBm | Reception signal strength |
| Reserved | | | |

7.2.2.1. Power Status Display Request

It is required when the MWPC Application collects power status information. The MWPC APP, in turn, displays the received power status information.

7.2.3. WPT Mode Selection Display

Users can select the WPT mode by UI display. The MWPC confirms user's selection by the UI display. When users select the sequential WPT mode, users can select the priority of MWPRs.

```
CMTA-Mode.display      {
                         ModeReq,
                         ModeRes,
                         WPT_ID,
                         Priority
                       }
```

For the values for the above message, refer to table 6 below

TABLE 7

Value for WPT mode selection display

| Parameter | Type | Value | Description |
|---|---|---|---|
| ModeReq | Binary | 0 or 1 | 0: Display<br>1: Not display |
| ModeRes | Binary | 0000~1110 (flag) | $1^{st}$ bit: Simultaneous mode<br>$2^{nd}$ bit: Time division mode<br>$3^{rd}$ bit: Foaming mode<br>Multi select: Compound mode |
| WPT_ID | Number | 0x00 to 0xFF | MWPR number |
| Priority | Number | 1 to 100 | Sequence number of each MWPR |
| Reserved | | | |

7.2.3.1. User Selection Request

It is required when the MWPC MGMT block needs users' selection on the WPT mode. As a result, the APP block displays the received user selection request.

7.2.3.2. User Selection Response

It is required when the APP block sends the information related users' selection on WPT mode. As a result, the MGMT block calculates the related parameters according to users' selection.

7.2.4. Scheduling Information Display

When sequential WPT mode is selected, the MGMT block calculates the related information such as priority and allocated time amount. And then the MGMT block sends the calculation results to the APP block for display. The definition of the interfaces is as follows:

```
CMTA-SCHDL.display    {
                      WPT_ID,
                      BattRemain,
                      BattDischarge,
                      Priority,
                      TimeAmount,
                      }
```

For the values for the above message, refer to table 7 below.

TABLE 8

Value for scheduling information display

| Parameter | Type | Value | Description |
|---|---|---|---|
| WPT_ID | Number | 0x00 to 0xFF | MWPR number |
| BattRemain | Number | 0% to 100% | Residual battery level of the receiver |
| BattDischarge | Number | 0% to 1000% | The extent of battery discharge |
| Priority | Number | 1 to 100 | Sequence number of each MWPR |
| TimeAmount | Number | 1 to 100000 sec | Charging time allocated to the receiver |
| Reserved | | | |

7.2.4.1. Scheduling Information Display

It is required when the MGMT block sends the scheduling related information to the APP block. As a result, the APP block displays the received scheduling related information.

7.2.5. Abnormal Situations Display

When MWPC detects abnormal situations such as foreign materials and sudden disappearance of MWPR, MWPC displays the related information with alarm, so that users resolve the abnormal situation.

```
CMTA-ABNR.display    {
                     Abnormal
                     RxPwr
                     Resolved
                     }
```

For the values for the above message, refer to table 8 below

TABLE 9

Value for abnormal situation display

| Parameter | Type | Value | Description |
|---|---|---|---|
| Abnormal | Binary | 0 or 1 | 0: Not applicable<br>1: Abnormal situation |
| RxPwr | Number | −50 to 100 dBm | Received power level |
| Resolved | Binary | 0 or 1 | 0: Unresolved<br>1: Resolved |
| Reserved | | | |

7.2.5.1. Abnormal Situations Management Request

It is required when MWPC detects an abnormal situation and sends the related information to the APP block. As a result, MWPC displays the situation so that users resolve the situation.

7.2.5.2. Abnormal Situations Management Response

It is required when the MWPC APP block receives a signal from users for resolving the situation. As a result, the MWPC APP block sends the resolution related information to the MGMT block.

7.3. Interface Between MGMT and MGMT

This item is mainly focused on the messages between MGMT blocks. Based on the messages delivered from and to MGMT block, the process of connection, disconnection, charging is carried out. Although it might seem as if the messages in between MGMT blocks are communicated directly via tunnelling, it undergoes general procedure and messages are passed down on to lower layer, then to other devices: MGMT(A)→APP→MAC→PHY→PHY→MAC→APP→MGMT(B). In order to perform the functionalities defined in Chapter 5, the interfaces shall be exchanged between MGMT blocks of MWPC and MWPR for efficient wireless power transfer. The system management and control shall be accompanied based on the exchanged interfaces. The interfaces exchanged between MGMT blocks are as follows:

7.3.1. MWPR Identification

Based on the ID data from MWPR, MWPC determines whether the power receiver is eligible or not for the service. The definition of the interface is as follows:

```
MTM-SCAN.request    {
                    Req_join,
                    WPT_ID,
                    }
```

For the values for the above message, refer to table 9 below

TABLE 10

Value for MWPR identification

| Parameter | Type | Value | Description |
|---|---|---|---|
| Req_join | Binary | 0 or 1 | 0: Standby request<br>1: Receiver connection request |
| WPT_ID | Number | 0x00~0xFF | Receiver ID |
| Reserved | | | |

7.3.1.1. MWPR ID Request

It is required when the MWPC sends the association requests to MWPRs. As a result, MWPR receives the ID request command from the MWPC.

7.3.1.2. MWPR ID Response

It is required when the response is ready for the ID request from MWPC. As a result, MWPC receives the ID data from MWPRs. The data is used for MWPC to determine whether the corresponding MWPR is eligible for the wireless power transfer service.

7.3.2. WPT Authentication

MWPC determines whether each MWPR is eligible for WPT based on the received ID data and informs all MWPRs of the result. The definition of the interfaces is as follows:

```
MTM-ELGB.inform    {
                   Accept_deny,
                   WPT_ID,
                   }
```

For the values for the above message, refer to table 10 below.

TABLE 11

Value for WPT authentication

| Parameter | Type | Value | Description |
| --- | --- | --- | --- |
| Accept_deny | Binary | 0 or 1 | 0: Ineligible for WPT<br>1: Eligible for WPT |
| WPT_ID | Number | 0x00~0xFF | A number is granted to an eligible power receiver as an ID. |
| Reserved | | | |

7.3.2.1. WPT Authentication Notification

It is required for MWPC to determine whether the service is eligible or not and informs the corresponding MWPR of the result. As a result, it selects eligible MWPRs for WPT and provides WPT to those MWPRs in the future.

7.3.3. MWPR Power Status Information

This interface is exchanged between MWPC and an MWPR for optimal power transfer according to the power status. The definition of the interfaces is as follows:

```
MTM-DEV.request    {
                   Frequency,
                   BattRemain,
                   BattDischarge,
                   MaxPwr,
                   RxPwr,
                   Type,
                   RSSI,
                   }
```

For the values for the above message, refer to table 11 below.

TABLE 12

Value for MWPR power status information

| Parameter | Type | Value | Description |
| --- | --- | --- | --- |
| Freq | Number | 30 kHz to 300 MHz | In case of the system that uses multiple wireless power transfer frequency bands, the frequency information to be scheduled to use in the corresponding power transfer. |
| BattRemain | Number | 0% to 100% | Residual battery level of the receiver |
| BattDischarge | Number | 0 to 1000 A | The extent of battery discharge |
| MaxPwr | Number | −50 to 100 dBm | Receiver's acceptable power level |
| RxPwr | Number | −50 to 100 dBm | Received power reception level |
| Type | Description | Receiver type | Description to distinguish the receiver type |
| RSSI | Number | −80 to 100 dBm | Reception signal strength |
| Reserved | | | |

7.3.3.1. MWPR Information Request

Before performing the wireless power transfer, it is required to recognize the power status. As a result, MWPC gathers the required power status information from all MWPRs.

7.3.3.2. MWPR Information Response

It is required when the MWPR power status information is ready to be sent to MWPC. As a result, MWPC gathers the required power status information from all MWPRs, and manages and controls for optimal WPT.

7.3.4. Zone Recognition

MWPC determines each MWPR belongs to which zone (charging zone or communication zone) based on the data sent from MWPRs, and informs those MWPRs of the result. The definition of the interfaces is as follows:

```
MTM-ZONE.inform    {
                   Zone,
                   }
```

For the values for the above message, refer to table 12 below.

TABLE 13

Value for zone recognition

| Parameter | Type | Value | Description |
| --- | --- | --- | --- |
| Zone | Binary | 0 or 1 | 0: Charging zone<br>1: Communication zone |
| Reserved | | | |

7.3.4.1. Zone Recognition Notification

It is required for the MWPC MGMT block to determine the zone of each MWPR and to send the result to the MWPC APP block. After determining the zones of all MWPRs, MWPC prepares WPT for MWPRs in the charging zone and keeps the standby status for MWPRs in the communication zone. When an MWPR in the communication zone comes to the charging zone, the WPT is prepared.

7.3.5. WPT Mode

Based on the collected information from all MWPRs, MWPC computes and determines the best WPT mode, and informs the selected WPT mode to all MWPRs. The definition of the interfaces is as follows:

```
MTM-MODE.inform    {
                   CharMode,
                   }
```

For the values for the above message, refer to table 13 below.

TABLE 14

Value for WPT mode

| Parameter | Type | Value | Description |
| --- | --- | --- | --- |
| CharMode | Number | 1 to 5 | 1: Sequential WPT mode<br>2: Simultaneous WPT mode<br>3 to 5: Reserved |
| Reserved | | | |

7.3.5.1. WPT Mode Information

It is required when the MWPC APP block selects MWPMS mode and inform the MWPR APP block of the selected mode. After the MWPR APP block recognizes the MWPMS mode, preparation for receiving power is possible according to the direction from MWPC.

7.3.5.2. WPT Mode Response

It is required when the MGMT block of an MWPR receives the MWPMS mode from the MWPC MGMT block and informs the MWPC MGMT block of the response. After MWPC confirms the response of an MWPR, it starts the specified WPT mode.

7.3.6. Scheduling Information

It is the information used in the sequential WPT mode. It includes the wireless power transfer priority and allocated time for each power receiver after scheduling. The definition of the interfaces is as follows:

```
MTM-SCHDL.inform      {
                          Priority,
                          TimeAmount,
                      }
```

For the values for the above message, refer to table 14 below.

TABLE 15

Value for scheduling information

| Parameter | Type | Value | Description |
| --- | --- | --- | --- |
| Priority | Number | 1 to 100 | Sequence number of each MWPR |
| TimeAmount | Number | 1 to 100000 sec | Time to charge each MWPR |
| Reserved | | | |

7.3.6.1. Scheduling Information Notification

It is required to inform each receiver of the scheduling information after calculating the scheduling value in the sequential WPT mode. By informing the priority data, it prevents confusion of the WPT and performs the scheduling.

7.3.6.2. Scheduling Information Response

It is required when the response is sent to MWPC after receiving the scheduling data. MWPC can check the response of MWPR and perform the scheduling-based wireless power transfer.

7.3.7. Abnormal Situations Management

In case of any abnormal situation, MWPC detects it and informs the corresponding MWPR of the situation. The definition of the interfaces is as follows:

```
MTM-ABNR.inform       {
                          Abnormal,
                          CharOff,
                          RxPwr
                      }
```

For the values for the above message, refer to table 15 below.

TABLE 16

Value for abnormal situations management

| Parameter | Type | Value | Description |
| --- | --- | --- | --- |
| Abnormal | Binary | 0 or 1 | 0: Not applicable<br>1: Abnormal situation |
| CharOff | Binary | 0 or 1 | 0: Charging coil Off<br>1: Charging coil On |
| RxPwr | Number | −50 to 100 dBm | Received power level |
| Reserved | | | |

7.3.7.1. Abnormal Situations Management

It is required when MWPC detects an abnormal situation and provide a solution. In case of any abnormal situation, MWPC sends information and command to the MWPR MGMT block for control.

7.3.7.2. Abnormal Situations Management Response

It is required when an MWPR provides the observed value and required information to MWPC to solve an abnormal situation. MWPC gets information from an MWPR to make accurate and quick decision or action.

7.3.8. MWPR Full Charge Notification

When an MWPR is fully charged, MWPR notifies MWPC of this event. The definition of the interfaces is as follows:

```
MTM-FULL.inform       {
                          Full,
                      }
```

For the values for the above message, refer to table 16 below.

TABLE 17

Value for MWPR full charge notification

| Parameter | Type | Value | Description |
| --- | --- | --- | --- |
| Full | Binary | 0 or 1 | 0: Not charged<br>1: Full charge |
| Reserved | | | |

7.3.8.1. MWPR Full Charge Notification

It is required when full charge of an MWPR needs to be informed to MWPC. After MWPC recognizing this event, it stops the power transfer service for the MWPR and excludes the MWPR from the WPT candidates.

7.3.8.2. MWPR Full Charge Notification Response

It is required when an MWPC is ready to send the response packet for full charge notification. It informs the response to the notified MWPR.

7.3.9. Power Transfer Termination Notification

When terminating the wireless power transfer by the request of user, the termination command is sent to all MWPRs to terminate the current WPT. The definition of the interfaces is as follows:

```
MTM-END.inform        {
                          End,
                      }
```

For the values for the above message, refer to table 17 below.

TABLE 18

Value for power transfer termination notification

| Parameter | Type | Value | Description |
| --- | --- | --- | --- |
| End | Binary | 0 or 1 | 0: Complete<br>1: Continuous |
| Reserved | | | |

7.3.9.1. Power Transfer Termination Notification

It is required when terminating the wireless power transfer by the request of user. As a result, the wireless power transfer is stopped.

7.3.9.2. Power Transfer Termination Reception Response

It is required when sending the response after an MWPR receives the wireless power transfer termination notification. It checks whether the MWPR has received the power transfer stop event or not.

7.3.10. Inter-Device WPT

When a MWPR is not able to find a MWPC, it can request WPT to other MWPRs in the neighborhood. A MWPR power requester requests WPT to a MWPR power provider, and the power provider can send a response to the power requester. The definition of the interfaces is as follows:

```
DMTM-.request             {
                          DevWPT_req,
                          DevWPT_res
                          }
```

For the values for the above message, refer to table 18 below.

TABLE 19

Value for inter-device WPT

| Parameter   | Type   | Value  | Description              |
|-------------|--------|--------|--------------------------|
| DevWPT_req  | Binary | 0 or 1 | 0: no request            |
|             |        |        | 1: WPT request           |
| DevWPT_res  | Binary | 0 or 1 | 0: disable               |
|             |        |        | 1: enable                |
| Reserved    |        |        |                          |

7.3.10.1. Inter-Device WPT Request

It is required when a MWPR power requester finds other MWPR power provider which enables to provide WPT. In consequence, the MWPR power provider sends the request information to the APP block to notify the request to users.

7.3.10.2. Inter-Device WPT Response

It is required when the MWPR power provider MGMT block receives the user's choice through the APP block. In consequence, the MWPR power provider MGMT block sends the user's choice to the MWPR power requester MGMT block.

7.4. Interface Between MGMT Block and App Block

It defines the interfaces between the MWPR MGMT block and the WPCU block for coupler management and control of the MWPR. If lower layers such as MAC and PHY, support functions of upper layer, then the functions are processed from lower layer.

7.4.1. Data Request

When data is required from MGMT block, it is informed to MWPRs. The definition of the interfaces is as follows:

```
Receiver information     {
                         Frequency,
                         BattRemain,
                         BattDischarge,
                         MaxPwr,
                         RxPwr,
                         Type,
                         RSSI,
                         }
```

For the values for the above message, refer to table 19 below.

TABLE 20

Value for data request

| Parameter  | Type   | Value               | Description                                                                                                                              |
|------------|--------|---------------------|------------------------------------------------------------------------------------------------------------------------------------------|
| Freq       | Number | 30 kHz to 300 MHz   | In case of the system that uses multiple wireless power transfer frequency bands, the frequency information to be scheduled to use in the corresponding power transfer. |
| BattRemain | Number | 0% to 100%          | Residual battery level of the receiver                                                                                                   |

TABLE 20-continued

Value for data request

| Parameter     | Type        | Value          | Description                               |
|---------------|-------------|----------------|-------------------------------------------|
| BattDischarge | Number      | 0 to 1000 A    | The extent of battery discharge           |
| MaxPwr        | Number      | −50 to 100 dBm | Receiver's acceptable power level         |
| RxPwr         | Number      | −50 to 100 dBm | Received power reception level            |
| Type          | Description | Receiver type  | Description to distinguish the receiver type |
| RSSI          | Number      | −80 to 100 dBm | Reception signal strength                 |
| Reserved      |             |                |                                           |

7.4.1.1. Receiver Information Request

It is required when a MGMT block requires receiver information of registered MWPR. As a result, MGMT block requests receiver information to APP block.

7.4.1.2. Receiver Information Response

It is required when APP block receives receiver information request from MWPC or MWPRs. As a result, APP block delivers receiver information to MGMT block.

7.5. Interface Between App Layer and Mac Layer(Informative)

It should be able to identify MAC layer from App layer. If MAC layer of the system support wireless power transfer, the genuine procedure should not be interfered.

```
MAC-Infomation           {
                         MAC_Type,
                         MAC_Version,
                         MAC_Address,
                         }
```

For the values for the above message, refer to table 21 below. Table 22 contains the value for MAC_type.

TABLE 21

Value of MAC identification

| Parameter   | Type   | Value       | Description     |
|-------------|--------|-------------|-----------------|
| MAC_Type    | Binary | 0~1111      | Type of MAC     |
| MAC_Version | Binary | 0~100       | Version of MAC  |
| MAC_Address | Binary | 0~unlimited | Address of MAC  |
| Reserved    |        |             |                 |

TABLE 22

Mac Type code

| Code      | MAC_type  |
|-----------|-----------|
| 0000      | MFAN      |
| 0001      | Bluetooth |
| 0010      | 802.15.4  |
| 0011      | NFC       |
| 0100      | 802.11    |
| 0101~1111 | reserved  |

7.5.1. MAC Identification Request

It is required when an APP block identifies the type of MAC layer. As a result, APP block receives information on MAC layer from the system. Upon receiving information on MAC, the proper value for packet header will be used.

7.6. Interface Between MGMT Block and Coupler Block

It defines the interface between the MWPR MGMT block and the WPCU block for coupler management and control of the MWPR.

7.6.1. Scheduling Control

The MWPR MGMT block includes information for the WPCU block control based on the received coupler control command to meet the scheduling. The definition of the interface is as follows:

```
DMTW-SCHDL.control      {
                            Req_SchedulingControl
                        }
```

For the values for the above message, refer to table 21 below.

TABLE 23

| Value for scheduling control | | | |
|---|---|---|---|
| Parameter | Type | Value | Description |
| Req_SchedulingControl | Binary | 0 or 1 | 0: Keep the current status |
| | | | 1: Control request |
| Reserved | | | |

7.6.1.1. Scheduling Control Notification

It is required when the MWPR receives the scheduling information from the MWPC. In consequence, the MWPR MGMT block controls the WPCU block based on the received scheduling information.

7.6.2. Current/Voltage Sensing

The MWPR MGMT block performs the current/voltage sensing to sense the variation of the reception network or to calculate the reception power, and the MGMT block defines the required information. The definition of the interface is as follows:

```
DMTW-SENS.request       {
                            Req_Sensing,
                            Current,
                            Voltage,
                        }
```

For the values for the above message, refer to table 22 below.

TABLE 24

| Value for current/voltage sensing | | | |
|---|---|---|---|
| Parameter | Type | Value | Description |
| Req_Sensing | Binary | 0 or 1 | 0: No request |
| | | | 1: Transfer request |
| Current | Number | 0 to 1000 A | Measured current |
| Voltage | Number | 0 to 1000 V | Measured voltage |
| Reserved | | | |

7.6.2.1. Current/Voltage Sensing Request

It requests sensing whenever wireless power is received for a specific time. In consequence, the MWPR MGMT block sends the control command to the WPCU block to sense the voltage and current while receiving power.

7.6.2.2. Current/Voltage Sensing Response

It is required when requesting the current/voltage sensing for the MWPR MGMT block to calculate the receiving power. In consequence, the MWPR WPCU block sends the measured current and voltage to the MWPR MGMT block.

7.6.3. Abnormal Situation Control

The MWPR MGMT block controls the MWPR WPCU block with the calculated parameters to solve an abnormal situation and includes the required information. The definition of the interfaces is as follows:

```
DMTW-ABNR.control       {
                            Req_AbnormalControl,
                        }
```

For the values for the above message, refer to table 23 below.

TABLE 25

| Value for abnormal situation control | | | |
|---|---|---|---|
| Parameter | Type | Value | Description |
| Req_AbnormalControl | Binary | 0 or 1 | 0: No change |
| | | | 1: Control request |
| Reserved | | | |

7.6.3.1. Abnormal situation control notification

It is required when the abnormal situation control information is received from the MWPR APP block. In consequence, the MWPR MGMT block controls the WPCU block based on the received abnormal situation control information.

7.6.4. Power Transfer Termination Control

The MWPR MGMT block controls the WPCU block for power transfer termination and includes the related information. The definition of the interfaces is as follows:

```
DMTW-END.control        {
                            Req_EndControl,
                        }
```

For the values for the above message, refer to table 24 below.

TABLE 26

| Value for power transfer termination control | | | |
|---|---|---|---|
| Parameter | Type | Value | Description |
| Req_EndControl | Binary | 0 or 1 | 0: No change |
| | | | 1: Control request |
| Reserved | | | |

7.6.4.1. Power Transfer Termination Control Notification

It is required when the power transfer termination control information is received from the MWPR MGMT block. The MWPR MGMT block controls the WPCU block based on the received power transfer termination control information.

7.6.5. Full Charge

When the battery of an MWPR is fully charged, the WPCU block control is required for terminating the power transfer and the related information is included. The definition of the interfaces is as follows:

| DMTW-FULL.control | { Req_FullControl, } |
|---|---|

For the values for the above message, refer to table 25 below.

TABLE 27

Value for full charge notification

| Parameter | Type | Value | Description |
|---|---|---|---|
| Req_FullControl | Binary | 0 or 1 | 0: No change<br>1: Control request |
| Reserved | | | |

7.6.5.1. Full Charge Notification

It is required when the MWPR MGMT block confirms the full charge of the battery. In order for the MWPR MGMT block not to receive power, it controls the MWPR coupler.

7.6.6. Inter-Device WPT

The MWPMS power requester MGMT block controls the WPCU block for receiving WPT from the power provider.

| DMTW-WPTD.control | { Req_WPTDControl, } |
|---|---|

For the values for the above message, refer to table 26 below.

TABLE 28

Value for inter-device WPT

| Parameter | Type | Value | Description |
|---|---|---|---|
| Req_WPTDControl | Binary | 0 or 1 | 0: Not receive WPT<br>1: Receive WPT |
| Reserved | | | |

7.6.6.1. Inter-Device WPT Control

It is required when the MWPMS power requester MGMT block receives the input about WPT between receivers from users. The MWPMS power requester WPCU block receives WPT from the power provider.

8. Procedures

8.1. General

There are five procedures, in broad, to provide most efficient wireless power transfer service to multiple receivers: association, general charging management, abnormal situation management, inter-device charging management, and termination.

8.2. Association

As for the connection request, charger sends communication signal (connection request). Having received, receiver sends its own receiver address as a response to connection request. A Charger checks received receiver address and decides association of designated receiver. If receiver is not allowed for WPT, charger sends denial message; if receiver is allowed for WPT, COM ID is allocated. Receiver sends COM ID notification to charger. Charger will request for device status, once receiver joins network. In return, receiver that has received device status request, will send its information (residual battery level, battery discharge rate, charging frequency, required reception power strength, etc.) to charger in device status response. In turn, charger will analyse received data and checks on eligibility of WPT to the receiver. When the receiver is within the charging zone and is eligible, charger allocates WPT ID and considers the receiver as a candidate for the following wireless power transfer service.

8.3. Group ID Set-Up

The charger is able to set-up groups of selective devices. Charger may send group ID set-up request packet, which contains assigning group ID. Power receivers check for the destination of the packet; if the packet is for the receiver, it returns group ID as a response. Upon reception of response packet, charger sends acknowledgement packet. Group set-up is completed when receiver confirms acknowledgement packet. If power receiver does not receiver acknowledgement, then it sends again the response packet.

8.4. General Charging Management

8.4.1. Simultaneous Charging

Before WPT, charger test frequency level. If it matches, charger transmits test power; MWPC carries out current and voltage sensing and finds appropriate impedance matching. Afterward, secondary in-depth test power is transferred from charger, and charger requests for device status to receive received power level at receiver. Receiver will return appropriate data in device status response. Efficiency is calculated with the data received, and the optimal impedance matching will be completed. With the second impedance matching, wireless power transfer service starts. The service continues until there is an abnormal situation or wireless power transfer is terminated by charger.

8.4.2. Sequential Charging

In the sequential power transfer mode, a charger calculates schedules based on the receiver information; charger informs all receivers of the sequences and times for wireless power transfer service. Each receiver receives WPT only when the receiver is on the right time slot. When the time slot is not for the receivers, they turn off the power antenna to maximize the efficiency of overall WPT.

Actual power transfer procedure is same as the procedure for simultaneous power transfer.

8.4.3. Foaming Charging

In the foaming power transfer mode, charger calculates and set a priority amongst receivers based on the device status and user configuration. The procedure is much similar to simultaneous and sequential charging, except for the priority set-up along with WPT schedule notification. If foaming is carried out along with simultaneous, it shall be done by charger adjusting with extra antenna. If foaming is carried out along with sequential, it shall be done by charger adjusting time length or controlling receivers' antenna. The actual power transfer procedure is same as the procedure for simultaneous power transfer.

8.4.4. Compound Charging

The procedure for compound charging is same as procedure for sequential charging, except for power receiving object being a group of receivers per each time slot instead of a single receiver. Charger will manage the priorities among the receivers to receive power transfer. Accordingly charger will divide time slot and allocate each slot to a different set of receivers.

8.5. Abnormal Situations Management

8.5.1. General

The current and voltage values are constantly measured to detect abnormal situations. When the variation in current/voltage value is measured or impedance derived is too large, charger takes it as an abnormal situation. Then charger determines whether the abnormal situation arose from foreign material, receiver appearance and disappearance, full charge of a receiver, or abrupt variation is discharge rate. It undertakes procedures accordingly to resolve abnormal situations.

8.5.2. Charger Status Detection

When charger detects variation in current/voltage, charger considers it an abnormal situation. Immediately, charger stops wireless power transfer and requests for device status (charging information) to all receivers, in order to specify the abnormal situation.

If variation in current/voltage was due to new receiver appearance, or existing receiver disappearance, a different set of receiver will reply device status to charger. Accordingly, charger will calculate and update new optimal impedance matching, before proceeding to WPT.

If the reply is from the same set of receivers, then a charger takes it as a foreign material detection. To find out whether the interference is temporary or continuous, charger tries wireless power transfer up to N times. If the variation persists, the foreign material is considered continuous and charger informs the user of it with the alarm function.

8.5.3. Receiver Status Detection
8.5.3.1. Full Charge

When receiver detects itself being fully charged, receiver informs charger of its full charge status and turns off power antenna. When full charge information is received, charger excludes fully charged receiver from the wireless power transfer candidates and starts to provide WPT to other receivers.

8.5.3.2. Discharge Rate Variation

When receiver detects any abrupt variation in battery discharge rate, it sends abrupt discharge variation rate data to charger.

A charger considers it as users using receiver. Charger is informed of such abnormality and changes the output power not to violate safety regulations for exposure to electric and magnetic fields. It cuts wireless power transfer service for a moment to change the output power level, before it restarts the service.

8.6. Inter-Device Charging Management

When receiver is unable to locate charger within its range, it can request wireless power transfer to a near receiver instead. For this case in particular, receiver in need of WPT will send inter-device WPT request to MWPR capable of performing WPT, if detected. WPT transferring receiver will return inter-device WPT response with eligibility. If accepted, each receiver will inform users of it, and receiver in need of WPT will be able to receive WPT for the time length provided.

8.7. Termination

When user commands wireless power transfer to be terminated to charger, charger cuts off wireless power transfer and waits for the next request in the standby mode.

8.8. Flow Chart
8.8.1. General Charging Management
8.8.1.1. Charger Flow Chart When charger is powered on, it searches for devices nearby. If there is not a device detected after device search, charger waits for a short delay before it search for device again. Upon detection of any objects, charger considers the possibility of the objects being power-down devices. Charger will transmit test power up to N times at the detection of power-down device before it move on to connection.

When there are objects detected, and there is not a power-down device detected, charger transfer to power receivers the request for connection. As charger receives connection response from power receivers, it calculates its ID allocation status. If all the ID addresses are fully occupied, then it waits for a delay to search for device again. If there are enough ID addresses for allocation, charger will send COM ID notification to provide COM ID to each power receivers.

To engage in WPT process, charger checks on the location of power receivers with COM ID to allocate WPT ID. If receivers with WPT ID do not require WPT, charger moves on to search for nearby devices again. If there are power receivers in need of WPT, it sends test power to adjust optical impedance matching for the best efficiency. When there are more than a single device within its range, it notifies user for WPT mode selection command. If charger is not able to receive any command, WPT is carried out in default mode; otherwise charger follows command. When there is a single device for power transfer, charger just initiates WPT.

During WPT, abnormality may be detected. Immediately, WPT is to be stopped. Charger checks if it is from foreign material detection.

If not, charger checks for repositioning devices; if it is assumed to be of foreign material, charger notifies user. User may command termination for system-off, or charger may return to beginning, searching for devices.

8.8.1.2. Receiver Flow Chart

When receiver is down in power, it receives periodic test power. As receiver receives initiation power, and when its accumulative amount reaches up to a minimum threshold level, the signalling antenna will be turned on to queue in for proper WPT. If the power is not sufficient, the receiver continues to receive initiation power until it can turn on signalling antenna.

Once signalling antenna is turned on, receiver waits to receive connection request from charger. Upon the reception of connection request, receiver returns response to receive ID allocation from charger. Once COM ID has been allocated, receiver updates its status for WPT. Afterward, receiver checks itself if it is in need of WPT. If not, receiver enters WPT isolation before turning on its antenna. If receiver is in need of WPT, it updates device status to received WPT ID. If receiver fails to be allocated of WPT ID, it isolates itself from WPT and waits until power level capacity of charger (Pc) becomes greater than receivable power level of receiver (Pr). Receiver will update its status when Pr≤Pc for WPT ID.

Receiver that has been allocated of WPT ID may receive proper WPT. Receiver will receive test power for impedance matching, notifying received power level. Unless device-detectable abnormality is detected while waiting for WPT, WPT is initiated when an optimal impedance matching is set. If abnormality is detected, it power receiver updates its status to be allocated of new WPT ID.

As receiver proceeds for WPT, it consistently checks whether the battery is fully charged or not. If fully charged, receiver will send full charge data to charger, updating its status. The fully charged receiver will not receive WPT. Otherwise WPT to receiver will continue until it will time out. When WPT is terminated, device status is checked for any variations. If there is, receiver updates its status to charger. If not, receiver will wait to receive test power for another WPT.

8.8.1.3. Device Search & Wake-Up WPT

In the standby mode, the device gets wake-up power transfer command then it makes a schedule. Follow by the schedule, wake-up power is transfer by changing frequency and impedance progressively. Once power is transfer, the device waits for the respond. According to the respond in the system, the device decides whether to keep this situation or change the frequency.

When the charger gets device search command in standby mode, the device decides if the other devices are connected. If the device is connected to other device, it sends the connection request follow by its specification to node. If the device is connected to more than 2 devices, it decides the schedule for the first and it sends connection request in order. If there is respond from other device, it allocates address to the node. If there is no respond, it makes the schedule for every device type connected to the device, and it sends request message in the order.

8.8.2. Inter-Device Charging Management 8.8.2.1. Charger Flow Chart

MWPR that is capable of performing wireless charging, unless it is requested of power transfer, will stay in standby when charger is not around. If it is requested of WPT from another receiver, MWPR will calculate its remaining battery level to check on the possibility of WPT. Provided that the charging MWPR has enough battery, its application will inform user that there was an inter-device WPT request. In the user approval stage, charging MWPR will block the device if user will disapprove. After user command approval, WPT will be initiated. WPT process will terminate when time ends or when error will be detected.

8.8.2.2. Receiver Flow Chart

In general, MWPR will be in standby to detect any device: primarily charger, or if not, another receiver. Upon detection of charger, MWPR will request WPT from charger. If there is not a charger, the MWPR will look for other receivers. When it detects, it will request WPT to the detected receiver nearby. If the detected receiver is able to carry out power transfer, and other conditions are met, the user of detected receiver may approve inter-device WPT. The inter-device WPT will be started, until it will time our or error is detected whilst.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a multi-device wireless power charger (MWPC) to wirelessly transfer power to a plurality of receivers, the method comprising:
   initializing power transfer service to the receivers;
   associating the MWPC with the receivers by transmitting a plurality of connection requests to the receivers at the same time, and receiving at least one response from the receivers, respectively, in response to the connection requests, wherein the at least one response comprises an identifier(ID) identifying a corresponding receiver among the receivers; and
   wirelessly transferring the power from the MWPC to at least one of the receivers based on a result of the associating so that the receiver is charged by the transferred power,
   wherein the ID comprises at least one from among an address, a communication port (COM) ID, a wireless power transfer (WPD) ID of the receiver.

2. The method of claim 1, wherein the transmitting the connection requests comprises periodically broadcasting connection request signals to the receivers to match the MWPC with the receivers having diverse frequency bands as operating frequency bands, respectively.

3. The method of claim 2, wherein the broadcasting is processed in-band and out-band scan to support the diverse frequency bands of the receivers.

4. The method of claim 1, wherein the associating the MWPC with the receivers comprises:
   transmitting the connection requests to the receivers;
   receiving respective addresses of the receivers in response to the connection requests; and
   registering the addresses and allocating a plurality of COM IDs to the receivers, respectively.

5. The method of claim 1, wherein the wirelessly transferring the power to the receivers comprises wirelessly broadcasting the power to the receivers having different operating frequency bands, respectively, at the same time using a coupler antenna of the MWPC.

6. The method of claim 5, wherein the broadcasting the power to the receivers at the same time comprises:
   transmitting a test power to the receivers;
   calculating efficiency after receiving respective reception power levels from the receivers; and
   calculating optimal impedance matching with the receivers based on the calculated efficiency.

7. The method of claim 1, wherein the wirelessly transferring the power to the receivers comprises:
   dividing a power transfer period into a plurality of time slots; and
   allocating each of the time slots to a group of receivers among the receivers.

8. The method of claim 1, further comprising:
   resolving abnormality within at least one of the MWPC and the receivers if an abnormal situation is detected during the wirelessly transferring the power.

9. The method of claim 8, wherein the resolving abnormality comprises:
   measuring a voltage and a current from the MWPC and the receivers; and
   immediately cutting power transfer to the receivers.

10. The method of claim 8, wherein the resolving abnormality comprises receiving reports about a detection of abrupt variation in a discharge rate or a full charge alert from the receivers.

11. The method of claim 1, wherein the response comprises information about a status of the receiver.

12. The method of claim 11, wherein the associating comprises:
   transmitting the connection requests to the receivers, respectively; and
   receiving, at the MWPC, the status of the receiver; and
   selecting, among the receiver, at least one target receiver to which the MWPC is to wirelessly transfer the power based on the status,
   wherein the status of the receiver comprises at least one of an operating frequency band of the receiver, battery information of the receiver, strength of a signal received at the receiver from the MWPC.

13. The method of claim 11, further comprising:
   allocating the COM ID to the receiver;
   receiving the status of the receiver to which the COM ID is allocated; and
   allocating the WPD ID to a target receiver, among the receiver, to which the MWPC is to wirelessly transfer the power based on the status, wherein the status of the receiver comprises at least one of an operating frequency band of the receiver, battery information of the receiver, strength of a signal received at the receiver from the MWPC.

14. A method of controlling a multi-device wireless power charger (MWPC) to wirelessly transfer power to a plurality of receivers, the method comprising:

initializing power transfer service to the receivers;

associating the MWPC with the receivers by transmitting a plurality of connection requests to the receivers at the same time, and receiving at least one response from the receivers, respectively, in response to the connection requests, wherein the at least one response comprises an identifier(ID) identifying a corresponding receiver among the receivers; and wirelessly transferring the power from the MWPC to at least one of the receivers based on a result of the associating so that the receiver is charged by the transferred power, wherein the wirelessly transferring the power to the receivers comprises:

dividing a power transfer period into a plurality of time slots, allocating each of the time slots to each of the receivers to maximize power transfer efficiency, and informing a power transfer schedule to the receivers regarding when to turn on and off respective coupler antennas of the receivers.

15. A method of controlling a receiver to wirelessly receive power transfer, the method comprising:

searching for a wireless power charger to wirelessly transfer power to the receiver by transmitting a connection request signal;

associating the wireless power charger with the receiver by receiving an identifier identifying the receiver in response to the connection request signal;

transmitting a request for power supply to at least one device which is configured to be wirelessly charged by the wireless power charger and uses a same type of wireless power transfer as the receiver, if the connection request signal is not responded;

wirelessly receiving power transfer if the request is approved by the device, wherein the ID comprises at least one from among an address, a communication port (COM) ID, a wireless power transfer (WPD) ID of the receiver.

* * * * *